United States Patent
Park et al.

(10) Patent No.: US 10,057,025 B2
(45) Date of Patent: Aug. 21, 2018

(54) APPARATUS AND METHOD FOR DETERMINING BEAM IN WIRELESS COMMUNICATION SYSTEM

(71) Applicants: Samsung Electronics Co., Ltd., Gyeonggi-do (KR); Korea Advanced Institute of Science and Technology, Daejeon (KR)

(72) Inventors: Sung Jin Park, Gyeonggi-do (KR); Min Hoe Kim, Daejeon (KR); Dong Ho Cho, Seoul (KR); Sun-Heui Ryoo, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 95 days.

(21) Appl. No.: 14/644,004

(22) Filed: Mar. 10, 2015

(65) Prior Publication Data
US 2015/0257073 A1    Sep. 10, 2015

(30) Foreign Application Priority Data
Mar. 10, 2014    (KR) .................. 10-2014-0027593

(51) Int. Cl.
| | |
|---|---|
| *H04L 5/00* | (2006.01) |
| *H04B 7/0408* | (2017.01) |
| *H04B 7/06* | (2006.01) |
| *H04B 7/024* | (2017.01) |
| *H04W 36/06* | (2009.01) |

(52) U.S. Cl.
CPC ......... *H04L 5/0048* (2013.01); *H04B 7/0408* (2013.01); *H04B 7/0617* (2013.01); *H04L 5/0023* (2013.01); *H04B 7/024* (2013.01); *H04L 5/0035* (2013.01); *H04W 36/06* (2013.01)

(58) Field of Classification Search
CPC ... H04L 5/0048; H04L 5/0023; H04L 5/0035; H04B 7/0408; H04B 7/0617; H04B 7/024; H04W 36/06
See application file for complete search history.

(56) References Cited

U.S. PATENT DOCUMENTS

| | | | |
|---|---|---|---|
| 8,548,466 B1 * | 10/2013 | Sarca ..................... | H04W 48/16 455/434 |
| 8,942,207 B2 | 1/2015 | Son et al. | |
| 9,144,082 B2 * | 9/2015 | Rubin | |
| 9,191,957 B2 * | 11/2015 | Kim ................... | H04W 72/046 |

(Continued)

FOREIGN PATENT DOCUMENTS

KR    10-2013-0034827    4/2013

*Primary Examiner* — Edan Orgad
*Assistant Examiner* — Ivan O Latorre

(57) ABSTRACT

A method to operate a receiving node is provided. The method includes receiving a first set of reference signals being transmit-beamformed using transmit beam groups in at least one transmitting node with receive-beamforming using receive beam groups. The method also includes transmitting information to select one transmit beam group of the transmit beam groups to one of the at least one transmitting node. The method further includes receiving a second set of the reference signals being transmit-beamformed using transmit beams of the one of the transmit beam groups in the at least one transmitting node with receive-beamforming using receive beams of one of the receive beam groups.

38 Claims, 25 Drawing Sheets

(56) References Cited

U.S. PATENT DOCUMENTS

| | | | | |
|---|---|---|---|---|
| 2008/0096561 A1* | 4/2008 | Liu | H04W 36/08 | 455/436 |
| 2009/0298502 A1* | 12/2009 | Hagerman | H04W 36/30 | 455/436 |
| 2010/0273492 A1* | 10/2010 | Liu | H04B 7/022 | 455/446 |
| 2011/0007685 A1* | 1/2011 | Ma | H01Q 25/00 | 370/315 |
| 2011/0113137 A1* | 5/2011 | Ramachandran | H04B 7/0695 | 709/224 |
| 2011/0182375 A1* | 7/2011 | Kim | H04W 72/0426 | 375/260 |
| 2011/0207494 A1* | 8/2011 | Zhu | H04B 7/024 | 455/509 |
| 2011/0237282 A1* | 9/2011 | Geirhofer | H04B 7/024 | 455/509 |
| 2012/0027111 A1* | 2/2012 | Vook | H04B 7/0452 | 375/267 |
| 2013/0040684 A1* | 2/2013 | Yu | H04B 7/0617 | 455/517 |
| 2013/0059619 A1* | 3/2013 | Kim | H04W 72/046 | 455/509 |
| 2013/0182683 A1* | 7/2013 | Seol | H04W 72/04 | 370/335 |
| 2013/0286960 A1* | 10/2013 | Li | H04W 72/042 | 370/329 |
| 2014/0071841 A1* | 3/2014 | Hu | H04L 5/0035 | 370/252 |
| 2014/0211731 A1* | 7/2014 | Inoue | H04B 7/0456 | 370/329 |
| 2014/0293803 A1* | 10/2014 | Wang | H04W 24/02 | 370/252 |
| 2014/0341048 A1* | 11/2014 | Sajadieh | H04L 5/0085 | 370/252 |
| 2015/0003325 A1* | 1/2015 | Sajadieh | H04W 76/10 | 370/328 |
| 2015/0009924 A1* | 1/2015 | Takano | H04L 5/0035 | 370/329 |
| 2015/0230263 A1* | 8/2015 | Roy | H04W 36/0083 | 455/452.2 |
| 2015/0289155 A1* | 10/2015 | Gao | H04L 5/0057 | 370/252 |
| 2016/0028519 A1* | 1/2016 | Wei | H04B 7/0456 | 375/267 |
| 2016/0211899 A1* | 7/2016 | Yang | H04B 17/318 | |
| 2018/0049042 A1* | 2/2018 | Yu | H04W 16/28 | |

\* cited by examiner

APPARATUS AND METHOD FOR DETERMINING BEAM IN WIRELESS COMMUNICATION SYSTEM

CROSS-REFERENCE TO RELATED APPLICATION(S) AND CLAIM OF PRIORITY

The present application is related to and claims the benefit under 35 U.S.C. § 119(a) to a Korean patent application filed in the Korean Intellectual Property Office on Mar. 10, 2014, and assigned Serial No. 10-2014-0027593, the entire disclosure of which is hereby incorporated by reference.

TECHNICAL FIELD OF THE INVENTION

The present disclosure relates generally to beamforming in a wireless communication system.

BACKGROUND OF THE INVENTION

Future mobile communications are expected to demand a higher data rate and a greater capacity as mobile devices remarkably change and sharply increase in number. Hence, millimeter wave (mmWave) is used between a Base Station (BS) and a Mobile Station (MS), and beamforming for efficient signal transmission and reception in the mmWave are under consideration.

The BS and the MS selects an optimal beam using beam scanning. However, since the BS supports a plurality of transmit beam directions and a plurality of receive beam directions of the MS, it takes a great time and great complexity to determine an optimal transmit beam and an optimal receive beam. Further, when the MS travels, the optimal transmit/receive beams change frequently. When the optimal transmit/receive beams change, control information required to re-determine the optimal transmit/receive beams cause considerable overhead. As discussed above, diverse variables are considered in order to maintain the optimal transmit/receive beams in the communication system using the beamforming. Thus, what is needed is a method for determining the optimal beam with low complexity for less time.

SUMMARY OF THE INVENTION

To address the above-discussed deficiencies of the prior art, it is a primary aspect of the present disclosure to provide an apparatus and a method for determining an optimal beam with low complexity in a wireless communication system.

Another aspect of the present disclosure is to provide an apparatus and a method for determining an optimal beam for less time in a wireless communication system. Yet another aspect of the present disclosure is to provide an apparatus and a method for scanning a beam using a beam group including a plurality of beams in a wireless communication system. Still another aspect of the present disclosure is to provide an apparatus and a method for scanning a beam using a composite beam which combines a plurality of beams of Base Stations (BSs) in a wireless communication system. A further aspect of the present disclosure is to provide an apparatus and a method for performing handover using a plurality of beam groups of BSs in a wireless communication system.

In a first embodiment, a method for operating a receiving node in a wireless communication system is provided. The method includes receiving a first set of reference signals being transmit-beamformed using transmit beam groups in at least one transmitting node with receive-beamforming using receive beam groups. The method also includes transmitting information for selecting one of the transmit beam groups to one of the at least one transmitting node. The method further includes receiving a second set of the reference signals being transmit-beamformed using transmit beams of the one of the transmit beam groups in the at least one transmitting node with receive-beamforming using receive beams of one of the receive beam groups.

In a second embodiment, a method for operating a transmitting node in a wireless communication system is provided. The method includes transmitting a first set of reference signals being transmit-beamformed using transmit beam groups to a receiving node. The method also includes receiving information for selecting one of the transmit beam groups from the receiving node. The method further includes transmitting a second set of the reference signals being transmit-beamformed using transmit beams of the one of the transmit beam groups to the receiving node.

In a third embodiment, an apparatus of a receiving node in a wireless communication system is provided. The apparatus includes a receiver configured to receive-beamform a first set of reference signals being transmit-beamformed using transmit beam groups in at least one transmitting node using receive beam groups. The apparatus is also configured to receive-beamforming a second set of the reference signals being transmit-beamformed using transmit beams of one of the transmit beam group using receive beams of one of the receive beam groups. The apparatus further includes a transmitter configured to transmit information for selecting the one of the transmit beam groups to one of the at least one transmitting node.

In a fourth embodiment, an apparatus of a transmitting node in a wireless communication system is provided. The apparatus includes a transmitter. The transmitter is configured to transmit a first set of reference signals being transmit-beamformed using transmit beam groups to a receiving node. The transmitter is also configured to transmit a second set of the reference signals being transmit-beamformed using transmit beams of one of the transmit beam groups to the receiving node. The apparatus also includes a receiver configured to receive information for selecting the one of the transmit beam groups from the receiving node.

Other aspects, advantages, and salient features of the invention will become apparent to those skilled in the art from the following detailed description, which, taken in conjunction with the annexed drawings, discloses exemplary embodiments of the invention.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components and structures.

DETAILED DESCRIPTION OF THE INVENTION

FIGS. 1A through 25, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device and communication system. The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein may be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present disclosure is provided for illustration purpose only and not for the purpose of limiting the invention as defined by the appended claims and their equivalents. It is to be understood that the singular forms "a," "an," and "the" include plural referents unless the context clearly dictates otherwise. Thus, for example, reference to "a component surface" includes reference to one or more of such surfaces. By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Exemplary embodiments of the present disclosure provide a technique for determining a preferred or optimal beam in a wireless communication system. Hereinafter, a term for identifying a signal, a term for identifying a beam, and terms for indicating network entities are used to ease the understanding. Accordingly, the present disclosure is not limited to those terms and adopts other equivalent terms.

Figure 1A:
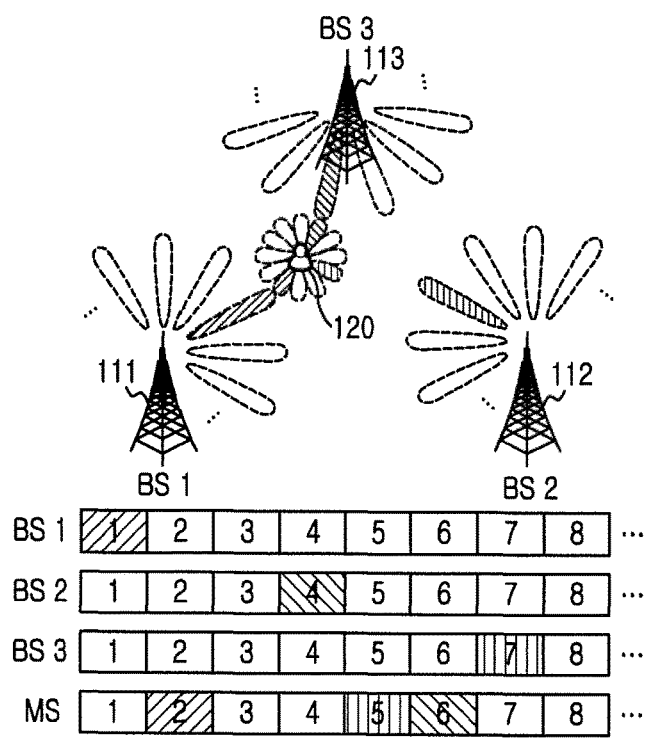
FIGS. 1A and 1B illustrate example beam determinations in a wireless communication system according to this disclosure.
Figure 1B:
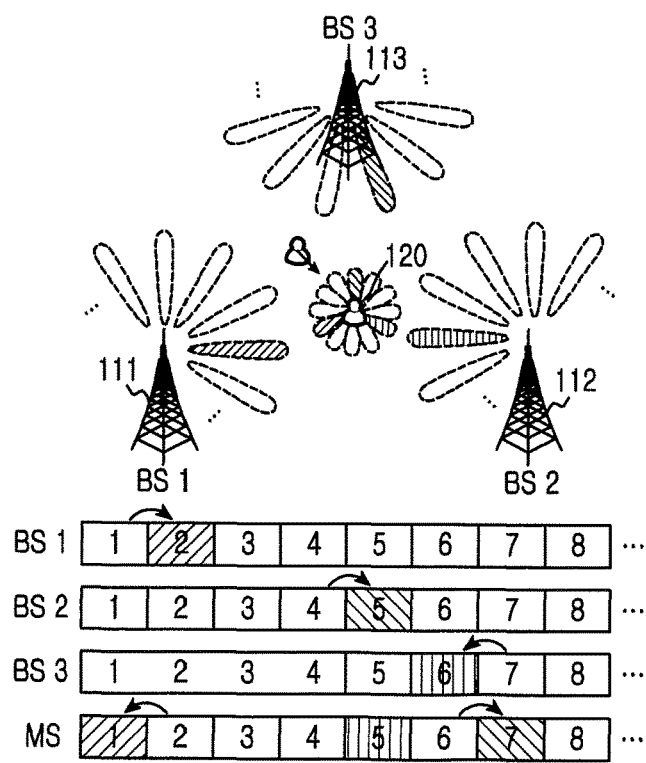

FIGS. 1A and 1B depict an example beam determination in a wireless communication system according to this disclosure. FIGS. 1A and 1B exemplify locations of a Mobile Station (MS) 120 before and after movement of the MS 120.

Referring to FIG. 1A, the MS 120 travels near a Base Station1 (BS1) 111, a BS2 112, and a BS3 113. The MS 120 communicates with at least one of the BS1 111, the BS2 112, and the BS3 113. In FIG. 1A, the MS 120 communicates with all of the BS1 111, the BS2 112, and the BS3 113. That is, the BS1 111, the BS2 112, and the BS3 113 create one BS set and service the MS 120. For example, the BS set includes one of a virtual cell and a cloud cell. It is noted that the present disclosure is not limited to the MS 120 communicating with the multiple BSs but is applicable to the MS 120 serviced by one BS.

In FIG. 1A, for the communication between the MS 120 and the BS1 111, a beam-1 of the BS1 111 is used as an optimal transmit beam and a beam-2 of the MS 120 is used as an optimal receive beam. For the communication between the MS 120 and the BS2 112, a beam-4 of the BS2 112 is used as the optimal transmit beam and a beam-6 of the MS 120 is used as the optimal receive beam. For the communication between the MS 120 and the BS3 113, a beam-7 of the BS3 113 is used as the optimal transmit beam and a beam-5 of the MS 120 is used as the optimal receive beam. That is, since the relative directions of the BSs 111, 112, and 113 in relation to the MS 120 are different from each other, the MS 120 receive signals of the BSs 111, 112, and 113 over the different receive beams.

Referring to FIG. 1B, as the MS 120 travels around, the optimal beam pair with each BS 111, 112, and 113 changes. The MS 120 determines the optimal beam pair by comparing measurement results of the signals received over the different beams. In so doing, since the plurality of the receive beams is also considered in addition to the BSs 111, 112, and 113, various determination metrics are deliberated. The measurement result is represented using channel quality, channel gain, and the like. For example, the measurement result is expressed using Received Signal Strength Information (RSSI), Signal to Noise Ratio (SNR), Signal to Interference and Noise Ratio (SINR), Carrier to Interference and Noise Ratio (CINR), and the like. In FIG. 1B, for the communication between the MS 120 and the BS1 111, a beam-2 of the BS1 111 is determined as the optimal transmit beam and a beam-1 of the MS 120 is determined as the optimal receive beam. For the communication between the MS 120 and the BS2 112, a beam-5 of the BS2 112 is determined as the optimal transmit beam and a beam-7 of the MS 120 is determined as the optimal receive beam. For the communication between the MS 120 and the BS3 113, a beam-6 of the BS3 113 is determined as the optimal transmit beam and a beam-7 of the MS 120 is used as the optimal receive beam. As such, the MS movement requires changing the optimal beam pair for the communication with the BS as shown in FIGS. 1A and 1B. Now, the determination of the optimal beam pair is explained.

Figure 2A:
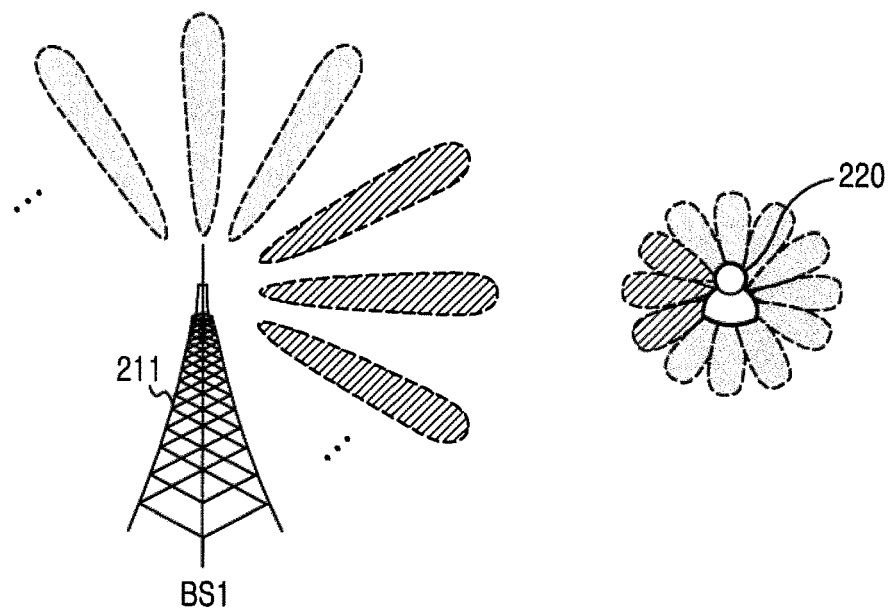
FIGS. 2A and 2B illustrate example beam groupings in the wireless communication system according to this disclosure.
Figure 2B:
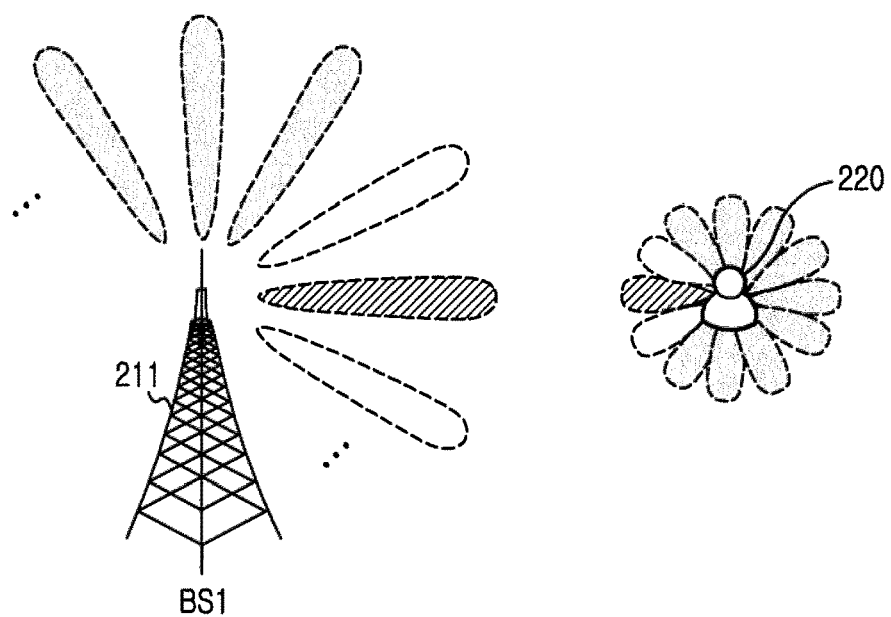

FIGS. 2A and 2B depict an example of beam grouping in the wireless communication system according to this disclosure. Referring to FIGS. 2A and 2B, a BS1 211 and an MS 220 support a plurality of beams. When an optimal beam pair is determined from pairs of the transmit beams of the BS1 211 and the receive beams of the MS 220, the measurement is required {the number of the transmit beams}× {the number of the receive beams} times. That is, the individual measurement for each transmit beam and each receive beam results in considerable complexity. Hence, the present disclosure provides the beam determination based on the beam grouping.

Referring to FIG. 2A, the BS1 211 transmits reference signals for the measurement over the plurality of the transmit beams at the same time. In other words, the BS1 211 transmits a plurality of the beamformed reference signals over the different beams. For doing so, the BS1 211 includes a signal processing means for the multiple beamforming. The MS 220 receive the reference signals over the plurality of the receive beams. That is, the MS 220 performs receive-beamforming the reference signals received from the BS1 211 using the receive beams. For doing so, the MS 220 includes a signal processing means for the multiple beamforming. The bundle of the beams for beamforming the reference signals transmitted at the same time are referred to as a beam set or a beam group.

In FIGS. 2A and 2B, three beams are grouped to one beam group by way of example. By virtue of the beamforming using the multiple beams, the BS1 211 and the MS 220 measures all of the beams by transmitting and receiving the reference signals fewer times than the individual beam measurement. For example, when three beams are grouped to one beam group, the number of the reference signal transmissions for the measurement is reduced to about ⅓.

Referring to FIG. 2B, the BS1 211 and the MS 220 performs the individual measurement on the transmit beams of the selected transmit beam group and the receive beams of the selected receive beam group and determine the optimal beam pair. That is, the BS1 211 sequentially transmits the reference signals by sequentially using the transmit beams of the selected transmit beam group. The MS 220 sequentially performs receive-beamforming the signals by sequentially using the receive beams of the selected receive beam group. Thus, the BS1 211 and the MS 220 determines the beam pair for providing the greatest channel gain.

In FIGS. 2A and 2B, the beam group includes the beams in the adjacent directions. Alternatively, the beams of one beam group may not be adjacent to each other. That is, nonadjacent beams form one beam group. As shown in FIGS. 2A and 2B, the BS1 211 and the MS 220 selects one beam group through the measurement per beam group and determine the optimal beam pair in the selected beam group. The measurement for selecting the beam group or the beam is performed using the reference signal. The reference signal is a signal arranged between the BS1 211 and the MS 220 and is referred to as a pilot signal, a synchronization signal, a preamble, a midamble, and a sounding signal. The reference signal is transmitted using a resource at a preset location, and the preset location is determined using at least one of a frame, a subframe, a slot, a carrier, a subcarrier, and a symbol.

Figure 3:
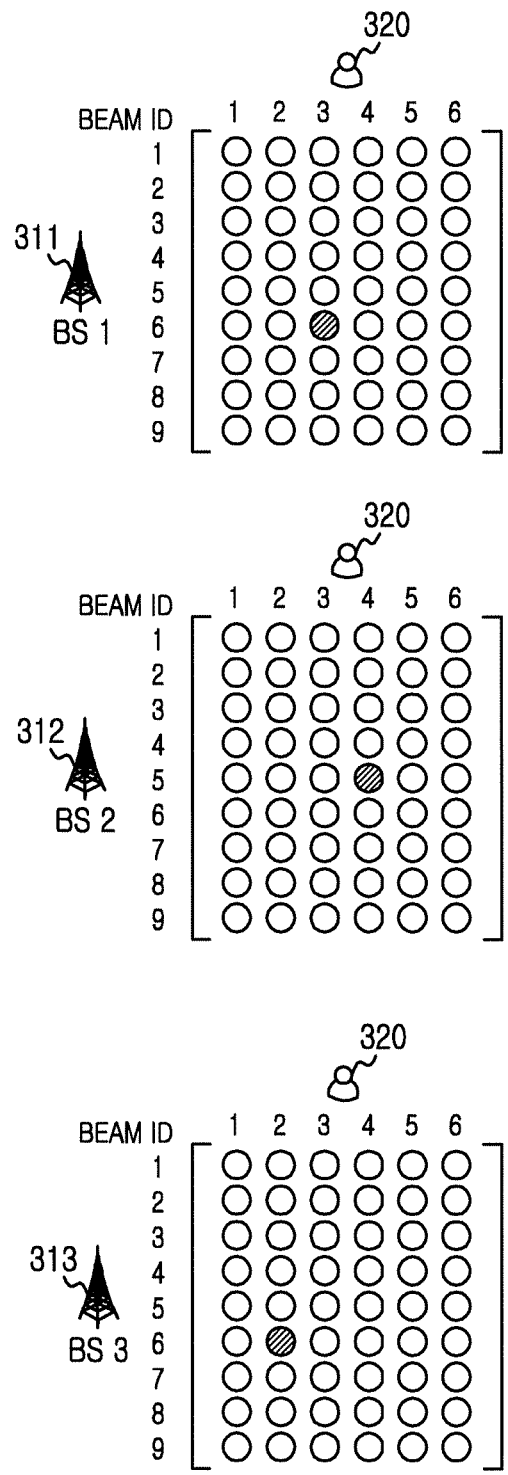
FIG. 3 illustrates an example of an optimal beam pair in the wireless communication system according to this disclosure.

FIG. 3 depicts an example optimal beam pair in the wireless communication system according to this disclosure. FIG. 3 exemplifies a way of representing a selected beam according to this disclosure. Referring to FIG. 3, the optimal beam pair is represented in a matrix. In each matrix, a row indicates a beam Identifier (ID) of the BS and a column indicates a beam ID of the MS. The beam ID is referred to as a beam index. To ease the understanding, a beam corresponding to a beam ID n is referred to as a beam-n. For an MS 320 and a BS1 311, an element <6, 3> is represented to indicate that a transmit beam-6 of the BS1 311 and a receive beam-3 of the MS 320 make the optimal beam pair. Similarly, for the MS 320 and a BS2 312, the optimal beam pair includes a transmit beam-5 of the BS2 312 and a receive beam-4 of the MS 320. For the MS 320 and a BS3 313, the optimal beam pair includes a transmit beam-6 of the BS3 313 and a receive beam-2 of the MS 320.

Figure 4A:
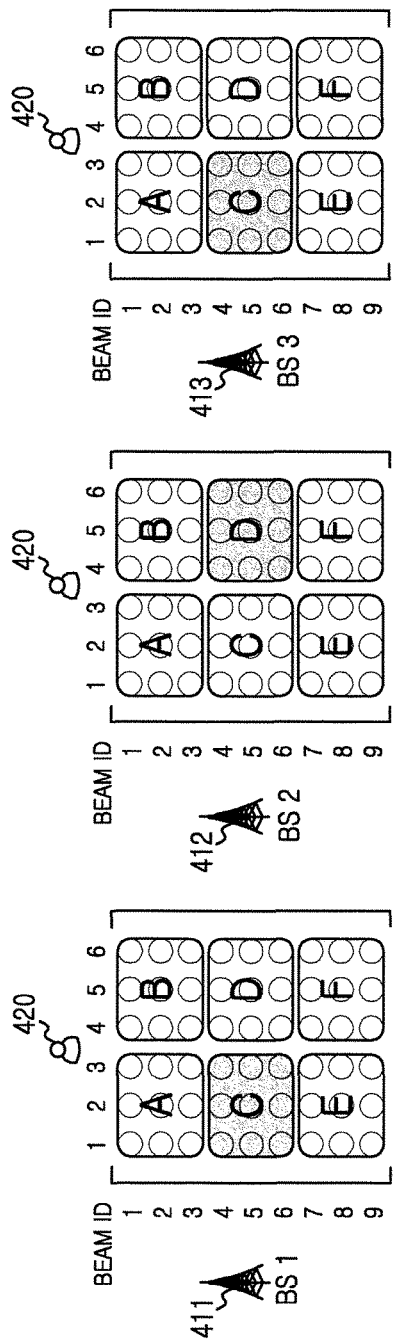
FIGS. 4A and 4B illustrate example beam determinations using a dedicated search in the wireless communication system according to this disclosure.
Figure 4B:
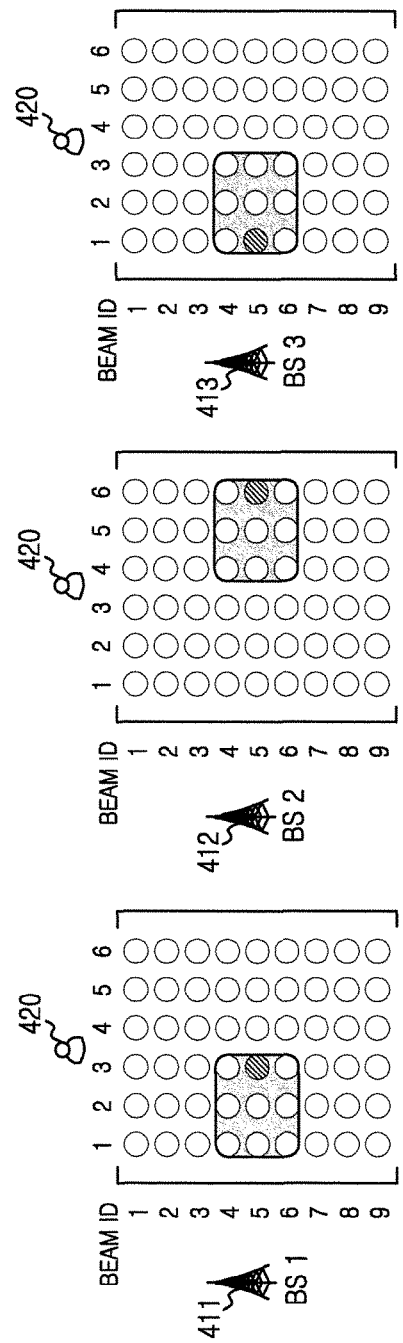

FIGS. 4A and 4B depict an example of beam determination using dedicated search in the wireless communication system according to this disclosure. The dedicated search system determines the optimal beam pair using the reference signals individually transmitted by the BSs when the MS has a plurality of serving BSs. Referring to FIG. 4A, three beams are grouped to one group. Since BSs 411, 412, and 413 supports nine transmit beams and an MS 420 support six receive beams, the BSs 411, 412, and 413 make six beam group pairs. That is, the BSs 411, 412, and 413 each support three transmit beam groups, and the MS 420 supports two receive beam groups. Hence, all of the beam group pairs is measured through six (=3×2) reference signal transmission opportunities per BS. Herein, the transmission opportunity is specified using a slot, a frame, and a subframe.

Using the reference signals beamformed with the transmit beam groups of the BSs 411, 412, and 413, the MS 420 measures the beam group pairs and selects a preferred or optimal beam group pair. For example, the BS1 411 transmits the reference signals beamformed with the three transmit beam groups, two times each. The MS 420 performs receive-beamforming the signals with two different receive beam groups with respect to the three transmit beam groups. In FIGS. 4A and 4B, the beam group pair-C is selected between the MS 420 and the BS1 411, the beam group pair-D is selected between the MS 420 and the BS2 412, and the beam group pair-C is selected between the MS 420 and the BS3 413. The beam group pair is selected by the MS 420, each BS 411, 412, and 413, or a separate control node.

After selecting the beam group pair, the MS 420 and the BSs 411, 412, and 413 determine the optimal beam pair in the selected beam group pair. Since one beam group pair includes the three transmit beams and the three receive beams, all of the beam group pairs is measured through nine (=3×3) reference signal transmission opportunities per BS. Using the reference signals beamformed with the transmit beams of the BSs 411, 412, and 413, the MS 420 measures the beam pairs and selects the preferred or optimal beam pair. For example, the BS1 411 transmits the reference signals beamformed with the three transmit beams, three times each. The MS 420 performs receive-beamforming the signals with the three different receive beams with respect to the three transmit beams. In FIGS. 4A and 4B, the beam pair of the transmit beam-5 and the receive beam-3 is selected between the MS 420 and the BS1 411, the beam pair of the transmit beam-5 and the receive beam-6 is selected between the MS 420 and the BS2 412, and the beam pair of the transmit beam-5 and the receive beam-1 is selected between the MS 420 and the BS3 413. The beam pair is selected by the MS 420, each BS 411, 412, and 413, or the separate control node. As above, the optimal beam pair is determined by stages with the less complexity than the full search which searches all of the beam pairs. More specifically, referring to FIGS. 4A and 4B, the full search measures one BS for 54 (=9×6) times in total, whereas the present search measures one BS for only 15 times including six (=3×2) times on the beam group and nine (=3×3) times on the beam.

The procedure of FIGS. 4A and 4B is performed to change the combination of the optimal beam pairs without changing the serving BS. The procedure of FIGS. 4A and 4B is also performed to change the serving BS. That is, the procedure of FIGS. 4A and 4B is used to change both of the beam and the serving BS. In addition, the procedure of FIGS. 4A and 4B is applied when the beam is changed in one BS, rather than the multiple BSs, or when the MS performs a handover from one BS to the other BS. Herein, the handover changes either all of the serving BSs or some of the serving BSs. Changing the serving BS either switches from the serving BS to the other BS or excludes the serving BS.

In FIGS. 4A and 4B, the BSs 411, 412, and 413 transmit the reference signals to the MS 420. In other words, FIGS. 4A and 4B depict the beam determination for the downlink communication. However, the procedure of FIGS. 4A and 4B is applied to the uplink communication, that is, to the determination of the combination of the optimal beam pairs with respect to the transmit beams of the MS 420 and the receive beams of the BSs 411, 412, and 413. In this case, the row corresponds to the receive beam ID of the BS and the column corresponds to the transmit beam ID of the MS in the matrix of FIGS. 4A and 4B.

Figure 5A:
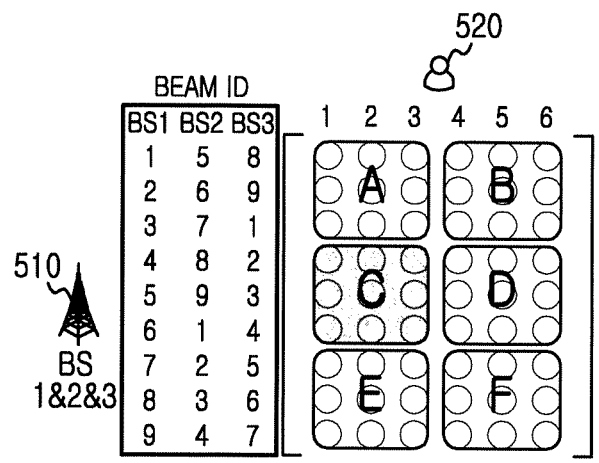
FIGS. 5A and 5B illustrate the example beam determinations using a collective search in the wireless communication system according to this disclosure.
Figure 5B:
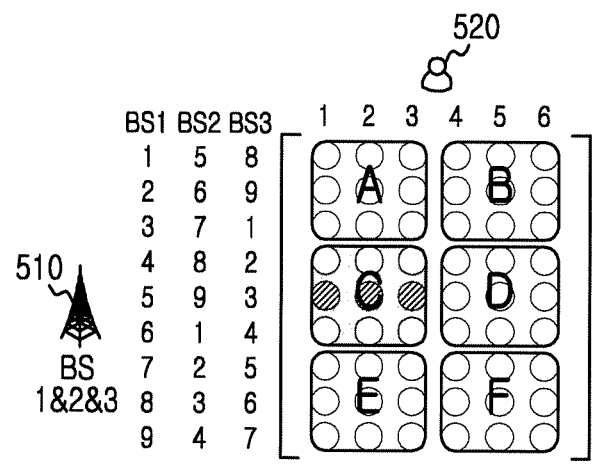

FIGS. 5A and 5B depict an example of beam determination using collective search in the wireless communication system according to this disclosure. According to the collective search, the MS determines the combination of the optimal beam pairs using the reference signals beamformed and simultaneously transmitted by the BSs. Hereafter, the beams of the different BSs for beamforming the signals simultaneously transmitted are referred to as composite beams, and the signals beamformed with the composite beam are referred to as composite beam signals.

Referring to FIG. 5A, nine transmit composite beams are defined and three composite beams are grouped to one group. Since BSs 510 support nine composite beams and an MS 520 supports six receive beams, six composite beam group pairs are produced. That is, the BSs 510 support three transmit composite beam groups and the MS 520 supports two receive beam groups. Hence, all of the composite beam group pairs are measured through six (=3×2) reference signal transmission opportunities.

Using the reference signals beamformed with the transmit composite beam groups of the BSs 510, the MS 520 measures each of the composite beam group pairs and selects the preferred or optimal composite beam group pair. For example, the BSs 510 transmit the reference signals beamformed with the three transmit composite beam groups, twice each. More specifically, in the first transmission opportunity and the second transmission opportunity, the BS1 transmits the reference signals beamformed with the transmit beam-1, the transmit beam-2, and the transmit beam-3, the BS2 transmits the reference signals beamformed with the transmit beam-5, the transmit beam-6, and the transmit beam-7, and the BS3 transmits the reference signals beamformed with the transmit beam-8, the transmit beam-9, and the transmit beam-1, all at the same time. In the third transmission opportunity and the fourth transmission opportunity, the BS1 transmits the reference signals beamformed with the transmit beam-4, the transmit beam-5, and the transmit beam-6, the BS2 transmits the reference signals beamformed with the transmit beam-8, the transmit beam-9, and the transmit beam-1, and the BS3 transmits the reference signals beamformed with the transmit beam-2, the transmit beam-3, and the transmit beam-4, all at the same time. In the fifth transmission opportunity and the sixth transmission opportunity, the BS1 transmits the reference signals beamformed with the transmit beam-7, the transmit beam-8, and the transmit beam-9, the BS2 transmits the reference signals beamformed with the transmit beam-2, the transmit beam-3, and the transmit beam-4, and the BS3 transmits the reference signals beamformed with the transmit beam-5, the transmit beam-6, and the transmit beam-7, all at the same time.

The MS 520 performs receive-beamforming the signals with the receive beam-1, the receive beam-2, and the receive beam-3 in the first transmission opportunity, the third transmission opportunity, and the fifth transmission opportunity, and performs receive-beamforming the signals with the receive beam-4, the receive beam-5, and the receive beam-6 in the second transmission opportunity, the fourth transmission opportunity, and the sixth transmission opportunity. In FIGS. 5A and 5B, the composite beam group pair-C is selected between the MS 520 and the BSs 510. The composite beam group pair is selected by the MS 520, each BS 511, 512, and 513, or the separate control node.

After selecting the composite beam group pair, the MS 520 and the BSs 510 determine the optimal composite beam pair in the selected composite beam group pair. Since one composite beam group pair includes three transmit composite beams and one receive composite beam, all of the composite beam pairs is measured through three (=3×1) reference signal transmission opportunities. Using the reference signals beamformed with the transmit composite beams in the BSs 510, the MS 520 measures the composite beam pairs and selects the preferred or optimal composite beam pair. For example, the BSs 510 transmit the reference signals beamformed with the three transmit composite beams, three times each. The MS 520 receives the reference signals over three different receive beams with respect to the three transmit composite beams. In FIGS. 5A and 5B, the selected composite beam pair includes the transmit beam-5 of the BS1, the transmit beam-9 of the BS2, and the transmit beam-3 of the BS3, and the receive beam-1, the receive beam-2, and the receive beam-3 of the MS. The composite beam pair is selected by the MS 520, each BS 511, 512, and 513, or the separate control node.

In FIGS. 5A and 5B, the composite beam of the MS 520 includes the beams of the adjacent IDs. Alternatively, the IDs of the beams of one composite beam may not be adjacent to each other. That is, the beams of nonadjacent IDs form one composite beam. The process in FIGS. 5A and 5B is performed to change the combination of the optimal beam pairs without changing the serving BS. The procedure of FIGS. 5A and 5B is also performed to change the serving BS. That is, the procedure of FIGS. 5A and 5B is used to change both of the beam and the serving BS. In addition, the procedure of FIGS. 5A and 5B is applied when the beam is changed in one BS, rather than the multiple BSs, or when the MS performs a handover from one BS to the other BS.

In FIGS. 5A and 5B, the BSs 510 transmit the reference signals to the MS 520. In other words, FIGS. 5A and 5B depict the beam determination for the downlink communication. However, the procedure of FIGS. 5A and 5B is applied to the uplink communication, that is, to the determination of the combination of the optimal beam pairs with respect to the transmit beams of the MS 520 and the receive beams of the BSs 510. In this case, the row corresponds to the receive beam ID of the BS and the column corresponds to the transmit beam ID of the MS in the matrix of FIGS. 5A and 5B. Unlike the dedicated search as explained in FIGS. 4A and 4B, in the collective search of FIGS. 5A and 5B, the BSs transmit the composite beam signals beamformed with the combinations of the predefined beam IDs, that is, with the predefined composite beams, and the MS determines the preferred or optimal composite beam pair. The MS, which communicates with the BSs, measures the composite beam signals simultaneously transmitted from the BSs and determine whether to change the beam or whether to perform a handover based on the measurement result.

The dedicated search of FIGS. 4A and 4B determines the beam pairs per BS, and the collective search of FIGS. 5A and 5B determines the composite beam pair regardless of the BS. The dedicated search and the collective search are different in determining the beam pair combination. However, when the combination of the beam pairs is determined and then cooperative transmission is performed, all of the beam pairs are applied to the transmit or receive signal in both of the dedicated search and the collective search. Yet, the collective search cannot distinguish the beam pair corresponding to each BS. That is, there is the difference in determining the combination of the beam pairs per BS, the dedicated search and the collective search both provide the combination of the beam pairs to be used between the multiple BSs and the MS.

Figure 6:
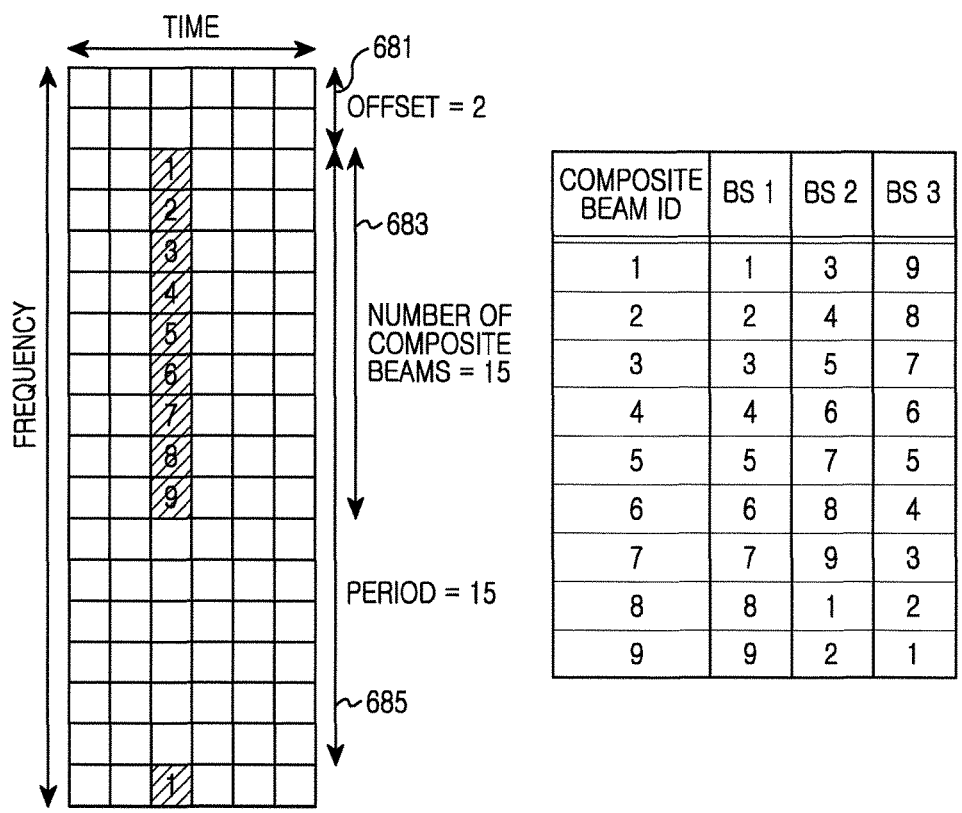
FIG. 6 illustrates an example of resource mapping of composite beam signals in the wireless communication system according to this disclosure.

The composite beam signal for the collective search is transmitted over some of frequency-time resources. For example, the composite beam signal is transmitted as shown in FIG. 6. FIG. 6 depicts resource mapping of composite beam signals in the wireless communication system according to an exemplary embodiment of the present disclosure. Referring to FIG. 6, nine composite beams are supported and accordingly nine composite beam signals are generated. The nine composite beam signals are transmitted over a resource indicated by an offset 681, the number of composite beam 683, and a period 685. In FIG. 6, the offset 681 is 2 subcarriers, the number of composite beam 683 is 9, and the period 685 is 15. Each composite beam signal is transmitted over one tone. In the same time resource, that is, in the same symbol, the composite beam signals are repetitively transmitted along the frequency axis.

In FIG. 6, the offset 681 and the period 685 are applied to the frequency axis. Alternatively, the offset 681 and the period 685 is applied to the time axis. In this case, the composite beam signals is arranged along the time axis in one subcarrier and repetitively transmitted in the time axis. The resource mapping for the composite beams of FIG. 6 is shared between the BSs. For example, the BSs for transmitting the composite beam signal over one composite beam share resource allocation information for the composite beam signals. In so doing, the resource allocation for the composite beam signals is determined by one BS or the separate control node.

Figure 7:
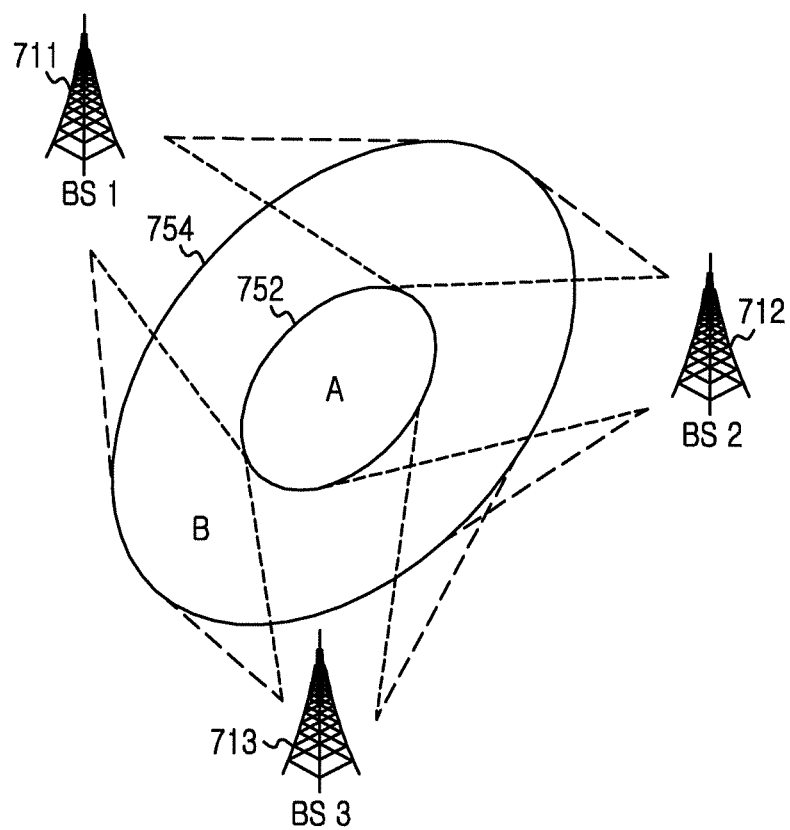
FIG. 7 illustrates an example of candidate beams selected for the composite beams in the wireless communication system according to this disclosure.

The resource mapping for the composite beams of FIG. 6 is informed to the MS. For example, the BS transmits the resource mapping information to the MS. More specifically, the resource mapping information, that is, the resource allocation information for the composite beam signals is transmitted over a control channel or a broadcasting channel. For example, the resource allocation information for the composite beam signals is provided as system information. The combination of the beams for the composite beams is variously defined. For example, the composite beams are defined by randomly combining the beams of the neighbor BSs. In so doing, candidate beams in a beam pool for the composite beam of the BS are restricted. For example, the candidate beams in the beam pool are restricted as shown in FIG. 7. FIG. 7 depicts candidate beams selected for the composite beams in the wireless communication system according to an exemplary embodiment of the present disclosure. In FIG. 7, the selection criterion is the space.

Referring to FIG. 7, an area A 752 and an area B 754 are common service coverage of a BS1 711, a BS2 712, and a BS3 713. The area A 752 overlaps the area B 754, and the area B 754 is wider than the area A 752. That is, when the selection criterion of the candidate beams is the area A 752, the BSs 711, 712 and 713 include beams toward the area A 752 into the beam pool. When the candidate beams selection criterion is the area B 754, the BSs 711, 712 and 713 include beams toward the area B 754 into the beam pool. Since the area B 754 is relatively wide, the beam pool includes more beams based on the area B 754 and more composite beams are defined.

To define composite beams for a particular BS, the BSs 711, 712 and 713 consider the current optimal beam pair combination of the MS. For example, the BSs 711, 712 and 713 define the composite beams by including a certain number of beams toward the beams of the current optimal beam pair combination in the beam pool and combining the candidate beams of the determined beam pool. For example, when the directions of the beams having the consecutive IDs are adjacent and the current optimal beam combination includes the beam-k of the BS, the BS determines (n+1)-ary beams including the beam-(k−n/2) through the beam-(k+n/2), as the candidate beams.

As such, the optimal beam determination method includes the measurement on the beam group pairs and the measurement on the beam pairs. While such a beam determination method provides the preferred or optimal beam pair to the MS, it is difficult to wait until the optimal beam pair is finally determined. For example, when the mobile excessively moves around and the handover is required within a short time, handover failure or radio link failure occurs before the optimal beam pair is finally determined. Hence, the MS determine only the preferred or optimal beam group pair and then perform the handover. That is, the MS performs the handover based on the beam group without measuring the beam pairs. The handover based on the beam group is referred to as fast search based handover. The fast search based handover is performed when a certain condition is satisfied. For example, the condition can include that a channel measurement metric based on the selected beam group should exceed a threshold.

Figure 8A:
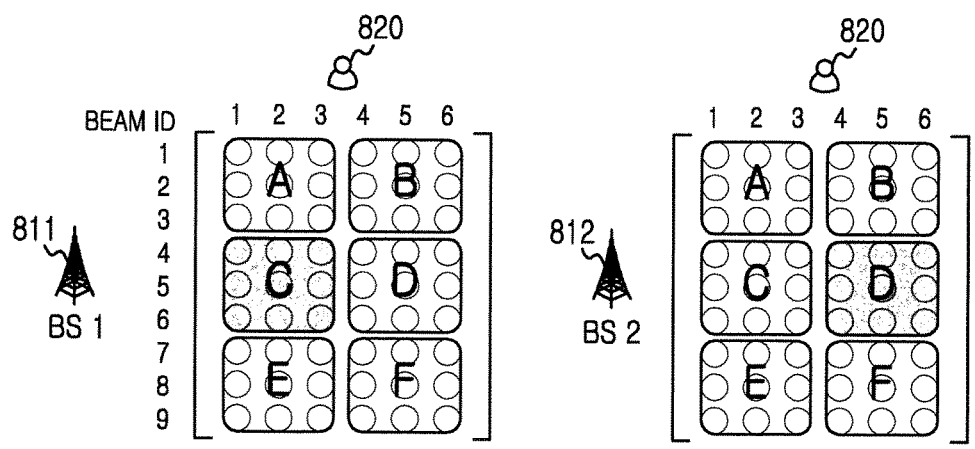
FIGS. 8A and 8B illustrate example beam groups selected for handover in the wireless communication system according to this disclosure.
Figure 8B:
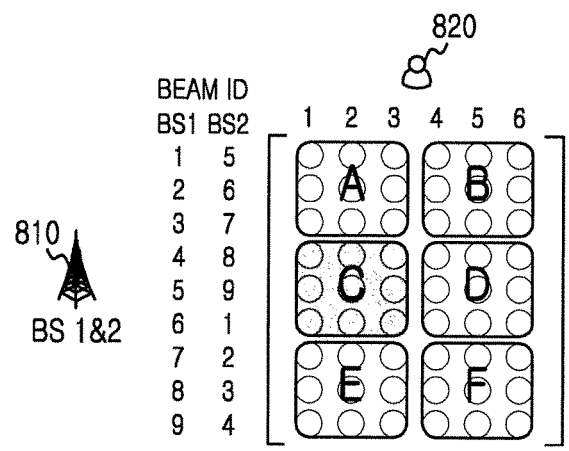

FIGS. 8A and 8B depict an example beam group selected for the handover in the wireless communication system according to this disclosure. FIG. 8A depicts the dedicated search and FIG. 8B depicts the collective search. Referring to FIGS. 8A and 8B, a BS1 811 and a BS2 812 are selected as target BSs. In FIG. 8A, an MS 820 measures beam groups of the BS1 811 and the BS2 812. The beam group-C is selected for the BS1 811 and the beam group-D is selected for the BS2 812 according to the measurement results. In FIG. 8B, the MS 820 measures composite groups of the BSs 810 (such as the BS1 811 and the BS2 812). As a result, the composite beam group-C is selected. Next, the MS 820 performs a handover using combinations of the beam pairs of the beam groups or the composite beam group, without measuring the beams of the selected beam group. For example, the MS 820 signals to the BS1 811 and the BS2 812 for the handover using the beam groups. In so doing, the MS 820 reports the selected beam groups to at least one of the serving BSs or the target BSs.

Figure 9:
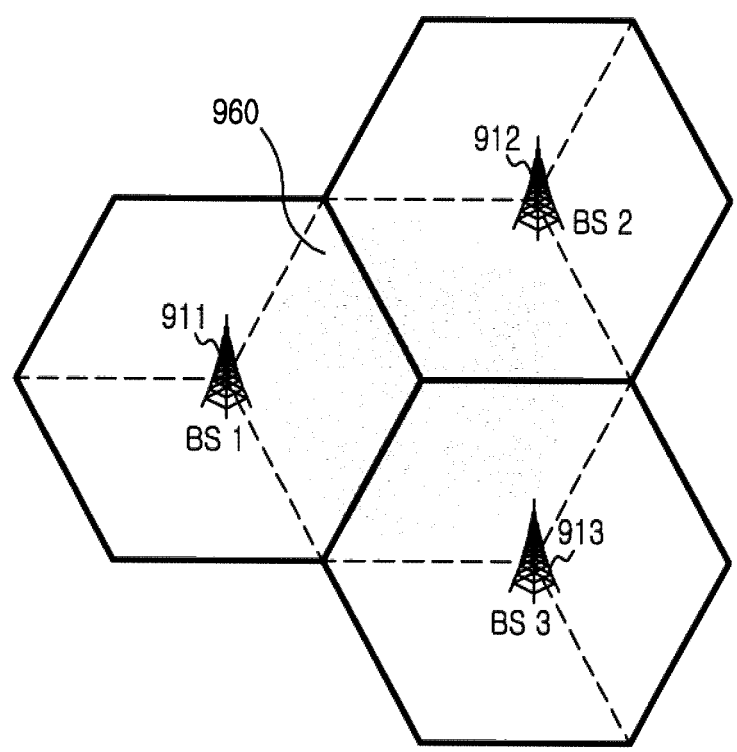
FIG. 9 illustrates example beams selected for the composite beam in the wireless communication system according to this disclosure.

FIG. 9 depicts example beams selected for the composite beam in the wireless communication system according to this disclosure. Three BSs 911, 912, and 913 are adjacent to each other. The BSs 911, 912, and 913 each obtains information on beam directions of the neighbor BSs. Namely, the BSs 911, 912, and 913 mutually share the information on the beam directions. For example, the information on the beam directions, which is shared, is managed by a separate central management device. The central management device is implemented using a separate entity or included in one of the BSs 911, 912, and 913.

The BSs 911, 912, and 913 form the composite beam including beams toward a cell boundary 960. That is, the BSs 911, 912, and 913 form the composite beam using the beams which greatly interfere with each other. For example, the composite beams are defined as a random combination within the total number of the composite beams. The random combination is fixed, not changed all the time, or changed at long intervals. A new beam ID according to the random combination is shared between the BSs 911, 912, and 913. For example, a beam-4 of the BS1 911, a beam-11 of the BS2 912, and a beam-17 of the BS3 913 is defined as one composite beam. In so doing, the composite beam including the beam-4 of the BS1 911, the beam-11 of the BS2 912, and the beam-17 of the BS3 913 are allocated a new ID being the composite beam-3.

Figure 10A:
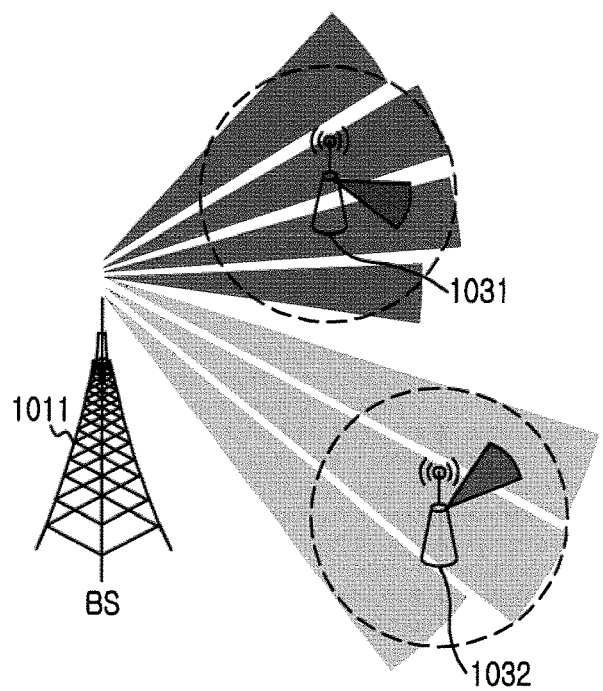
FIGS. 10A and 10B illustrate example beams selected for the composite beam in the wireless communication system according to this disclosure.
Figure 10B:
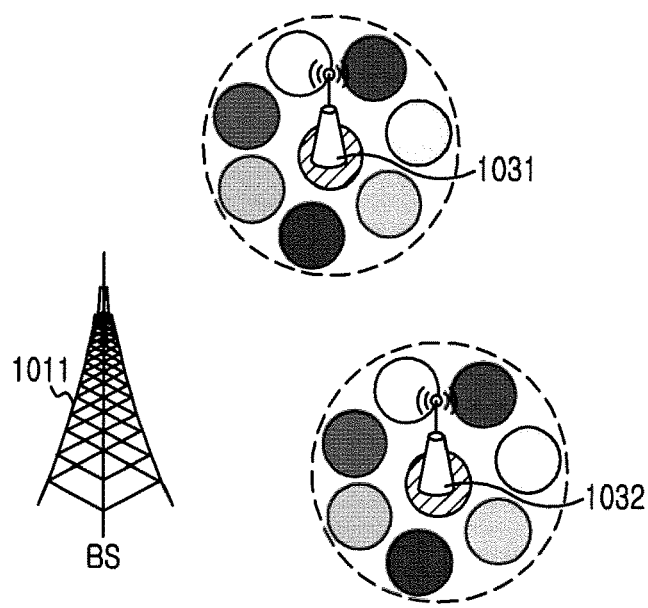

FIGS. 10A and 10B depict example beams selected for the composite beam in the wireless communication system according to this disclosure. A macro BS 1011 and small BSs 1031 and 1032 reside in a hierarchical network environment. The small BS is referred to as a femto BS or a pico BS. Referring to FIGS. 10A and 10B, the central management device manages the macro BS 1011 and the small BSs 1031 and 1032. The central management device is included in the macro BS 1011. The macro BS 1011 forms the composite beam together with the beams of the small BSs 1031 and 1032. In so doing, the macro BS 1011 considers its beam direction and the beam directions of the small BSs 1031 and 1032. The number of the supportable composite beams differs according to whether the beam of the macro BS 1011 is in 2-dimension (2D) or 3D.

In FIG. 10A, the 2D beam is used. The 2D beam indicates beams of the directivity defined in the 2D plane when the ground is taken as the plane. Hence, the macro BS 1011 defines the composite beam with the first small BS 1031 using the beams overlapping the cell of the first small BS 1031. Also, the macro BS 1011 defines the composite beam with the second small BS 1033 using the beams overlapping the cell of the second small BS 1032.

In FIG. 10B, the 3D beam is used. The 3D beam indicates beams of the directivity defined based on not only the 2D plane on the ground but also a vertical axis of the ground. Hence, the macro BS 1011 defines the composite beam with the first small BS 1031 using the beams toward one point in the cell of the first small BS 1031. Also, the macro BS 1011 defines the composite beam with the second small BS 1033 using the beams toward one point in the cell of the second small BS 1032.

Figure 11A:
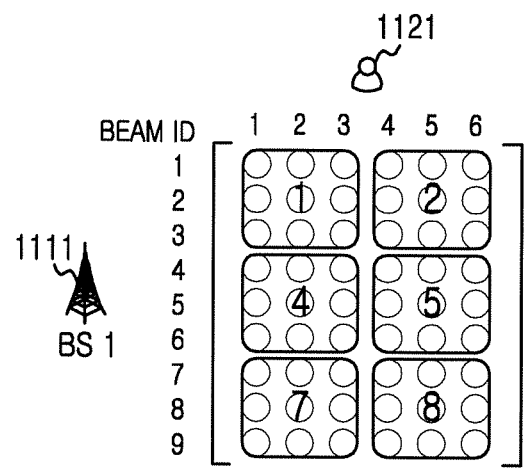
FIGS. 11A and 11B illustrate examples of the beam grouping based on Mobile Station (MS) capability difference in the wireless communication system according to this disclosure.
Figure 11B:
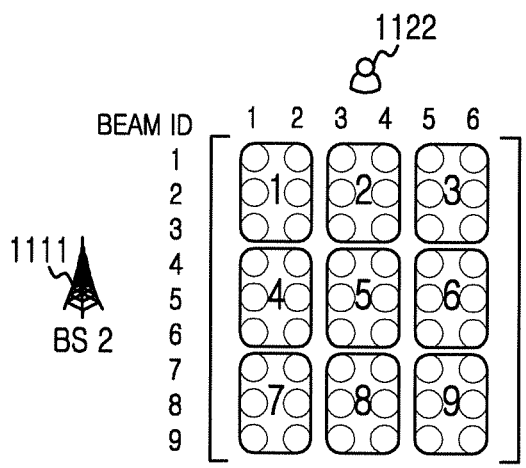

FIGS. 11A and 11B depict an example of beam grouping based on MS capability difference in the wireless communication system according to this disclosure. Referring to FIGS. 11A and 11B, a BS1 1111 supports three transmit beam groups, an MS 1 1121 supports two receive beam groups, and an MS2 1122 supports three receive beam groups. The MS1 1121 measures all of the receive beam groups through two reference signal transmissions from the BS1 1111. By contrast, to measure all of the receive beam groups, the MS2 1122 requires three reference signal transmissions of the BS1 1111.

Hence, the BS1 1111 needs to know the number of the receive beam groups of the MSs 1121 and 1122. To measure every beam group pair, the reference signals beamformed identically needs to be transmitted as many times as the number of the receive beam groups. For the plurality of the MSs 1121 and 1122, the BS1 111 should determine the number of the reference signal transmissions according to the maximum number of the receive beam groups of the MSs 1121 and 1122.

In FIGS. 11A and 11B, the MS1 1211 requires two reference signal transmissions for each transmit beam group, and the MS2 121 requires three reference signal transmissions for each transmit beam group. The BS1 1111 transmits the reference signal three times per transmit beam group. At this time, the MS1 1121 may not measure the signal during one transmission per transmit beam group. In more detail, provided that the maximum number of the receive beam groups of the MSs is M and the number of the receive beam groups of the i-th MS is $N_i$, the i-th MS receives the reference signal in the first through $(M-N_i)$-th reference signal transmission opportunities and suspend measuring in the $(M-N_i+1)$-th through M-th reference signal transmission opportunities.

Figure 12:
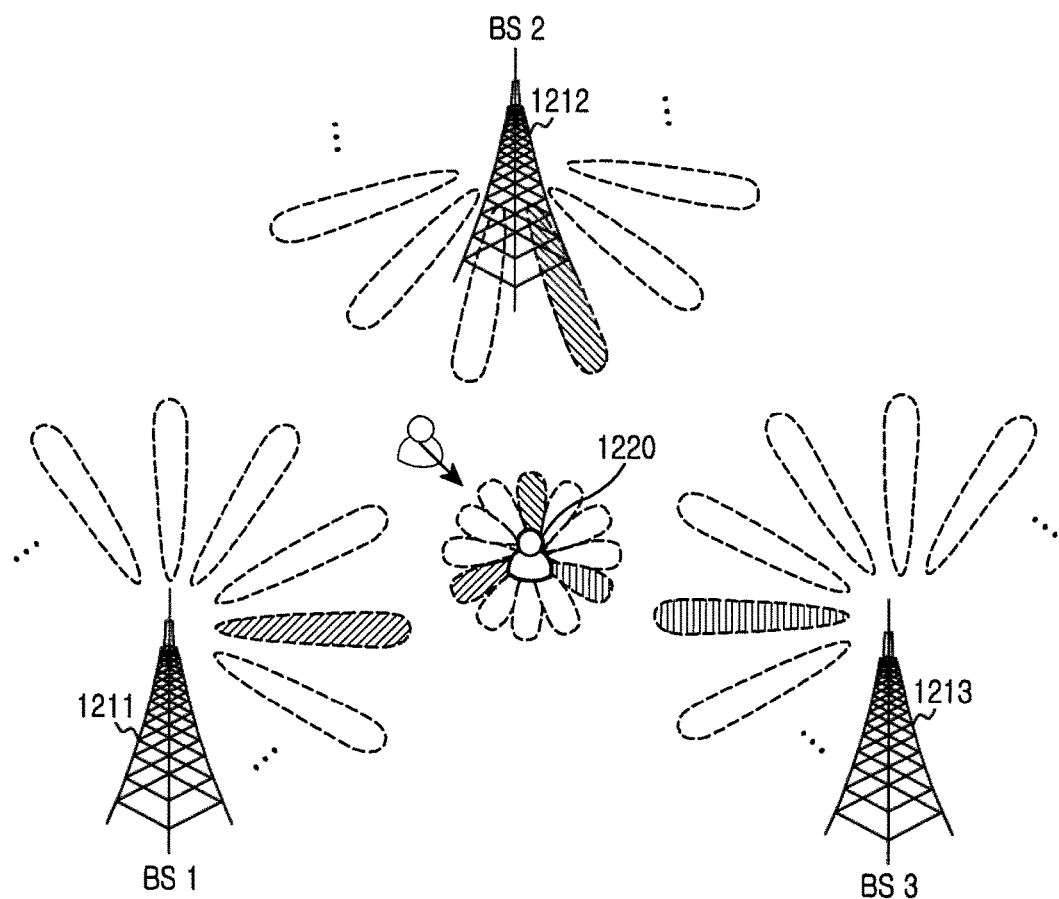
FIG. 12 illustrates an example of beam search results in the wireless communication system according to this disclosure.

FIG. 12 depicts an example of beam search results in the wireless communication system according to this disclosure. Referring to FIG. 12, an MS 1220 determines one optimal beam pair for each of a BS1 1211, a BS2 1212, and a BS3 1213 and thus determines a beam pair combination for the BSs 1211, 1212, and 1213. The beam pair combination is determined using the dedicated search or the collective search.

Using the dedicated search, the MS determines the optimal beam pair with each BS through the independent process for each BS. The dedicated search determines the optimal beam pair per BS and thus increases reliability in terms of the individual BS. Accordingly, the dedicated search is advantageous when the channel quality of a particular BS is better than that of other BSs. Still, the dedicated search takes the relatively long time to determine the beam pair combination, compared to the collective search. Using the collective search, the MS determines the beam pair combination through the single process with the composite beam of the BSs. The collective search is more advantageous than the dedicated search when data is transmitted and received through the cooperative transmission. That is, when the channel quality of the BSs is alike, the collective search is relatively more effective. However, the effect of the collective search widely varies according to the transmit/receive beam group selection method.

Figure 13:
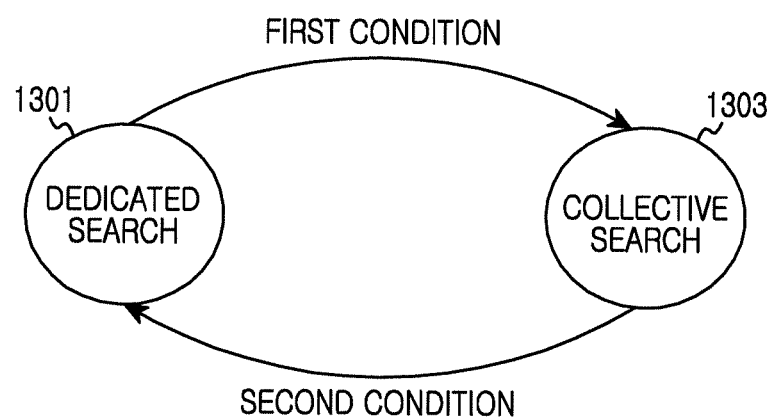
FIG. 13 illustrates an example of a search type change in the wireless communication system according to this disclosure.

Thus, the present disclosure provides a method for adaptively performing the dedicated search and the collective search according to the situation. The adaptive switch between the dedicated search and the collective search is explained by referring to FIG. 13. FIG. 13 depicts an example search type change in the wireless communication system according to this disclosure. Referring to FIG. 13, the switch between the dedicated search 1301 and the collective search 1303 is possible. When a first condition is satisfied during the dedicated search 1301, the search is switched to the collective search 1303. When a second condition is satisfied during the collective search 1303, the search is switched to the dedicated search 1301. One of the dedicated search 1301 and the collective search 1303 is the default, and the default search is selected in various manners.

When the first condition is satisfied, the MS in the dedicated search mode 1301 transitions from the dedicated search mode 1301 to the collective search mode 1303. For example, the first condition can include that a deviation between the individual channel qualities of the BSs fall below a first threshold. Since the deviation below the first threshold implies the advantageous channel for the cooperative transmission, the collective search mode 1303 is advantageous for the scanning. Herein, the deviation is estimated using at least one of a variance of the channel qualities and a difference between the maximum and the minimum.

When the second condition is satisfied, the MS in the collective search mode 1303 transitions from the collective search mode 1303 to the dedicated search mode 1301. For example, the second condition includes the composite channel quality below a second threshold. The composite channel quality is based on the premise that the composite beam is used, and indicates a statistical channel quality of the channels of the BSs. The composite channel quality below the second threshold implies that the collective search 1303 is not effective, for example, the cooperative transmission is not appropriate. Thus, the MS transitions to the dedicated search 1301.

When the BSs supports only one mode at the same time, all of the MSs connected to the BSs are affected by the mode transition. Hence, the BSs change the search mode only when the request is received from the MSs over a certain number. As such, the MS determines the beam pair combination with the BSs according to the dedicated search or the collective search. For the handover, the MS also searches for the neighbor BSs besides the serving BS. The MS searches for every neighbor BS but the unconditional search results in a considerable overhead. Thus, the present disclosure provides a method for selecting the neighbor BS to search.

Figure 14:
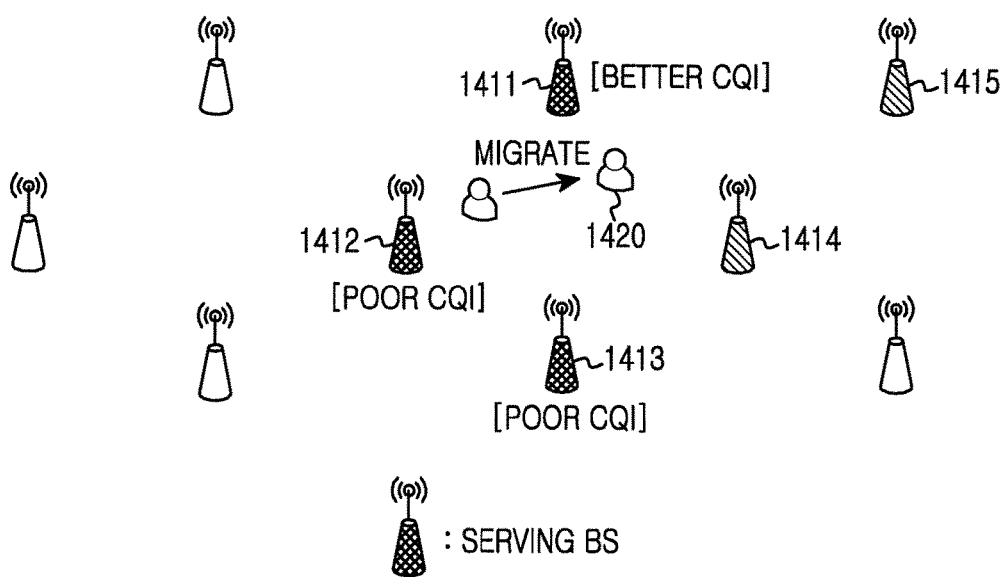
FIG. 14 illustrates an example of a neighbor Base Stations (BSs) selected to search in the wireless communication system according to this disclosure.

FIG. 14 depicts an example of neighbor BSs selected to search in the wireless communication system according to this disclosure, where a plurality of serving BSs resides. Referring to FIG. 14, an MS 1420 has three BSs 1411, 1412, and 1413 as its serving BSs. Accordingly, the MS 1420 determines the optimal beam combination with the BSs 1411, 1412, and 1413 using the dedicated search or the collective search. In the dedicated search or the collective search, when the channel quality of the BSs 1411, 1412, and 1413 being the present serving BS is good, the MS 1420 searches only the BSs 1411, 1412, and 1413.

As the MS 1420 travels, the channel quality of at least one of the BSs 1411, 1412, and 1413 is degraded. In this case, the handover is required. The MS 1420 includes at least one neighbor BS, except the serving BS, to the search target. For example, the neighbor BS in the search target includes a neighbor BS adjacent to the BS of the relatively good channel quality among the serving BSs. For example, the channel quality of the BS1 1411 is relatively good among the BSs 1411, 1412, and 1413 in FIG. 14. Accordingly, a BS4 1414 and a BS5 1415 near the BS1 1411 is included in the search target. That is, the neighbor BSs of the BS2 1412 and the BS3 1413 having the relatively poor channel quality is excluded from the search target.

For doing so, the MS 1420 reports the required neighbor BS search to the MS1 1411 of the relatively good channel quality. The BS1 1411 requests the neighbor BS4 1414 and BS5 1415 to transmit the reference signal for the MS 1420, and requests the control node to schedule the reference signal transmission. Herein, the control node is implemented using a separate entity, or the BS1 1411 or other BS functions as the control node. The BS1 1411 directs the MS 1420 to search the BS4 1414 and the BS5 1415.

Figure 15:
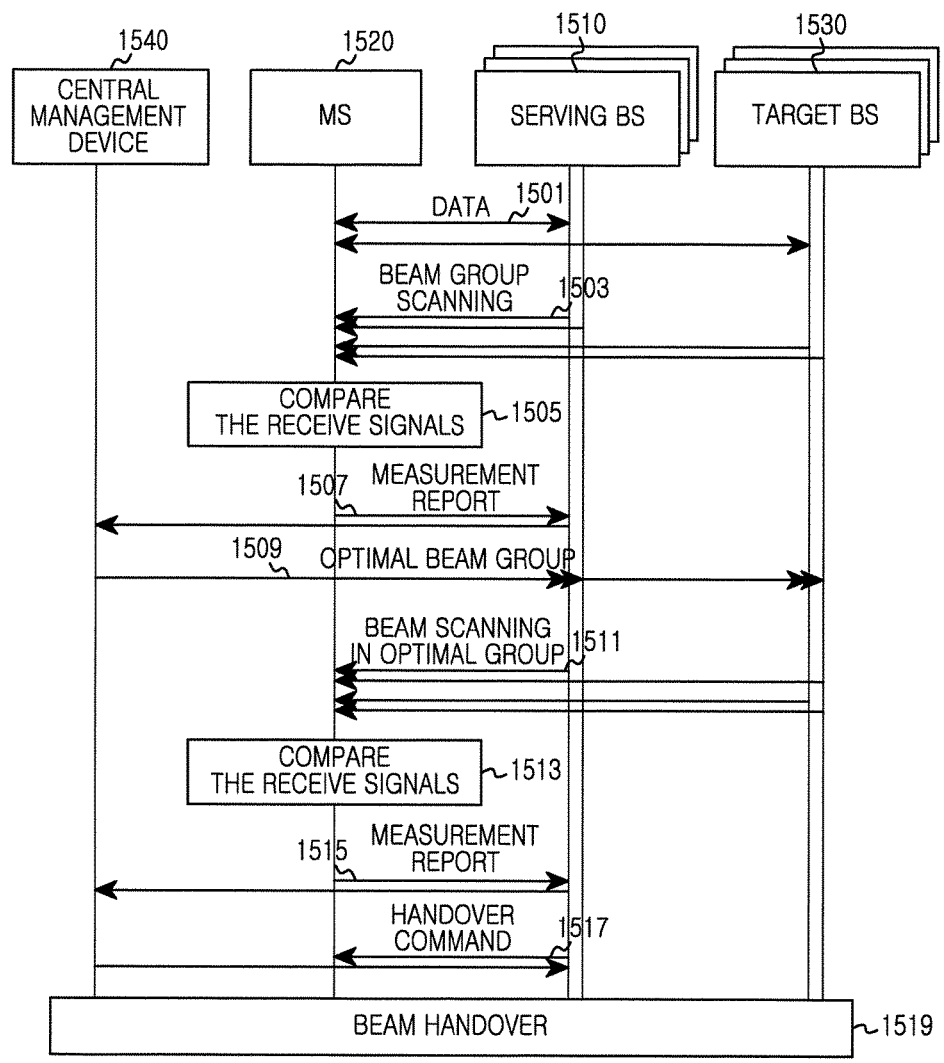
FIG. 15 illustrates an example signal exchange for the beam search in the wireless communication system according to this disclosure.

FIG. 15 depicts an example of a signal exchange for the beam search in the wireless communication system according to this disclosure. Referring to FIG. 15, an MS 1520 transmits and receives data to and from a serving BS 1510 in operation 1501. The serving BS 1510 includes one or more BSs. When a plurality of serving BSs 1510 is defined, the data is transmitted and received using the cooperative transmission.

In operation 1503, the MS 1520 scans the beam group of the serving BS 1510 and a target BS 1530. The target BS 1530 includes one or more BSs. The beam group scanning denotes a scanning procedure where a reference signal is transmitted with transmit-beamforming using the transmit beams during one reference signal transmission opportunity, and the reference signal is received with receive-beamforming using the receive beams. In operation 1505, the MS 1520 compares the signals received from the serving BS 1510 and the target BS 1530. In other words, the MS 1520 measures the channel quality per beam group with respect to the serving BS 1510 and the target BS 1530. The channel quality per beam group is measured individually for each BS.

In operation 1507, the MS 1520 transmits a measurement report to the serving BS 1510, and the serving BS 1510 forwards the measurement report to a central management device 1540. When the serving BS 1510 includes a plurality of BSs, the MS 1520 transmits the measurement report to one BS which manages the control. The measurement report includes the measurement result of operation 1505. For example, the measurement report includes at least one of the channel quality per beam group pair of the BSs included in the serving BS 1510 and the target BS 1530, information indicating the beam group pair of the best channel quality, and information indicating the transmit beam group of the beam group pair of the best channel quality.

In operation 1509, the central management device 1540 determines the optimal beam group based on the measurement report and transmits the optimal beam group report to the serving BS 1510 and the target BS 1530. Herein, the optimal beam group is determined for each BS of the serving BS 1510 and the target BS 1530. In operation 1511, the MS 1520 scans the individual beam in the optimal beam group of the serving BS 1510 and the target BS 1530. For doing so, the BSs of the serving BS 1510 and the target BS 1530 transmit the reference signals beamformed with the transmit beams of the optimal beam group determined by the central management device 1540. Hence, the MS 1520 receives the reference signals through the multiple reference signal transmission opportunities and beamforms the signals with the receive beams of the optimal beam group.

In operation 1513, the MS 1520 compares the signals received from the serving BS 1510 and the target BS 1530. In other words, the MS 1520 measures the channel quality per beam with respect to the serving BS 1510 and the target BS 1530. The channel quality per beam is measured individually for each BS. In operation 1515, the MS 1520 transmits the measurement report to the serving BS 1510, and the serving BS 1510 forwards the measurement report to the central management device 1540. When the serving BS 1510 includes the plurality of the BSs, the MS 1520 transmits the measurement report to one BS which manages the control. The measurement report includes the measurement result of operation 1513. For example, the measurement report includes at least one of the channel quality per beam pair of the BSs included in the serving BS 1510 and the target BS 1530, information indicating the beam pair of the best channel quality, and information indicating the transmit beam of the beam pair of the best channel quality.

In operation 1517, the central management device 1540 determines the handover of the MS 1520 based on the measurement report and transmits a handover command for the MS 1520. The serving BS 1510 transmits the handover command to the MS 1520. The handover command directs the MS 1520 to perform a handover from the serving BS 1510 to the target BS 1530, and include the information indicating the beam pair combination of the target BS 1530 for the handover. In operation 1519, the MS 1520, the serving BS 1510, and the target BS 1530 perform a beam handover procedure. Herein, the beam handover procedure includes at least one of the serving BS change and the beam pair change of the same serving BS.

In FIG. 15, the central management device 1540 is the separate object from the BSs. Alternatively, the central management device 1540 is included in the serving BS 1510 or the target BS 1530, or is implemented a part of other BS. In FIG. 15, the serving BS 1510 and the target BS 1530 are the different entities. It is noted that the serving BS 1510 and the target BS 1530 are logically separated and some of them are implemented as a physically common device. More specifically, there is no common BS between the serving BS 1510 and the target BS 1530, all of the BSs of the serving BS 1510 and the target BS 1530 are common, the BSs of the serving BS 1510 are included in the target BS 1530, the BSs of the target BS 1530 is included in the serving BS 1510, or some of the BSs of the serving BS 1510 and the BSs of the target BS 1530 are common. When all of the BSs of the serving BS 1510 and the target BS 1530 are common, the handover procedure of FIG. 15 includes only the beam changing. In this case, the beam scanning in operations 1503 and 1511 is performed as the single operation regardless of the serving BS 1510 and the target BS 1530.

Figure 16:
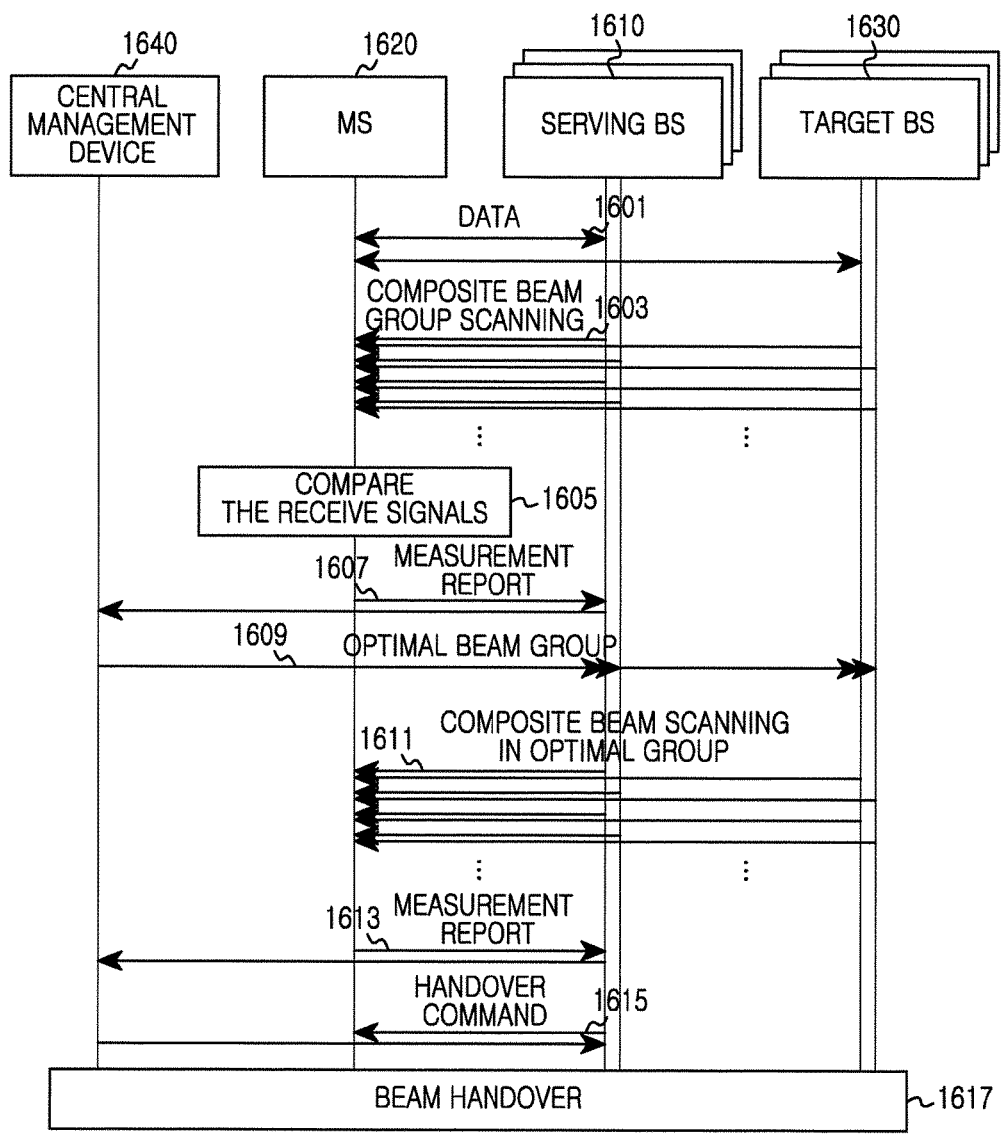
FIG. 16 illustrates an example signal exchange for the beam search in the wireless communication system according to this disclosure.

FIG. 16 depicts an example of signal exchange for the beam search in the wireless communication system according to this disclosure. Referring to FIG. 16, an MS 1620 transmits and receives data to and from a serving BS 1610 in operation 1601. The serving BS 1610 includes one or more BSs. When the serving BS 1610 includes a plurality of BSs, the data is transmitted and received using the cooperative transmission.

In operation 1603, the MS 1620 scans the composite beam group of the serving BS 1610 and a target BS 1630. The target BS 1630 includes one or more BSs. In the composite beam group scanning, the BSs perform transmit-beamforming of the reference signal with the transmitting composite beams during one reference signal transmission opportunity and perform receive-beamforming the signal with the receive beams. In operation 1605, the MS 1620 compares the signals received from the serving BS 1610 and the target BS 1630. In other words, the MS 1620 measures the channel quality per composite beam group with respect to the serving BS 1610 and the target BS 1630. The channel quality per composite beam group is measured individually for the serving BS 1610 and the target BS 1630.

In operation 1607, the MS 1620 transmits the measurement report to the serving BS 1610, and the serving BS 1610 forwards the measurement report to a central management device 1640. When the serving BS 1610 includes a plurality of BSs, the MS 1620 transmits the measurement report to one BS which manages the control. The measurement report includes the measurement result of operation 1605. For example, the measurement report includes at least one of the channel quality per composite beam group pair of the serving BS 1610 and the target BS 1630, information indicating the composite beam group pair of the best channel quality, and information indicating the transmit composite beam group of the composite beam group pair of the best channel quality.

In operation 1609, the central management device 1640 determines the optimal composite beam group based on the measurement report and transmits the optimal composite beam group report to the serving BS 1610 and the target BS 1630. Herein, the optimal composite beam group is determined for each of the serving BS 1610 and the target BS 1630.

In operation 1611, the MS 1620 scans the individual composite beam in the optimal composite beam group of the serving BS 1610 and the target BS 1630. For doing so, the BSs of the serving BS 1610 and the target BS 1630 transmit the reference signals beamformed with the transmitting composite beams of the optimal composite beam group determined by the central management device 1640. Hence, the MS 1620 receives the reference signals through the multiple reference signal transmission opportunities and beamforms the signals with the receive beams of the optimal composite beam group.

In operation 1613, the MS 1620 transmits the measurement report of the individual composite beam to the serving BS 1610, and the serving BS 1610 forwards the measurement report to the central management device 1640. When the serving BS 1610 includes the plurality of the BSs, the MS 1620 transmits the measurement report to one BS which manages the control. For example, the measurement report includes at least one of the channel quality per composite beam of the serving BS 1610 and the target BS 1630, the information indicating the composite beam pair of the best channel quality, and the information indicating the transmit composite beam of the composite beam pair of the best channel quality.

In operation 1615, the central management device 1640 determines the handover of the MS 1620 based on the measurement report and transmits the handover command for the MS 1620. The serving BS 1610 transmits the handover command to the MS 1620. The handover command directs the MS 1620 to perform a handover form the serving BS 1610 to the target BS 1630, and include the information indicating the composite beam of the target BS 1630 for the handover. In operation 1617, the MS 1620, the serving BS 1610, and the target BS 1630 perform the beam handover procedure. Herein, the beam handover procedure includes at least one of the serving BS change and the beam pair combination change of the same serving BS.

In FIG. 16, the central management device 1640 is the separate object from the BSs. Alternatively, the central management device 1640 is included in the serving BS 1610, the target BS 1630, or other BS. In FIG. 16, the serving BS 1610 and the target BS 1630 are the different entities. It is noted that the serving BS 1610 and the target BS 1630 are logically separated in FIG. 16 and some of them are implemented as a physically common device. More specifically, there is no common BS between the serving BS 1610 and the target BS 1630, all of the BSs of the serving BS 1610 and the target BS 1630 are common, the BSs of the serving BS 1610 are included in the target BS 1630, the BSs of the target BS 1630 are included in the serving BS 1610, or some of the BSs of the serving BS 1610 and the BSs of the target BS 1630 are common.

When all of the BSs of the serving BS 1610 and the target BS 1630 are common, the handover procedure of FIG. 16 includes only the beam changing. In this case, the beam scanning in operations 1603 and 1611 is performed as the single operation regardless of the serving BS 1610 and the target BS 1630.

Figure 17:
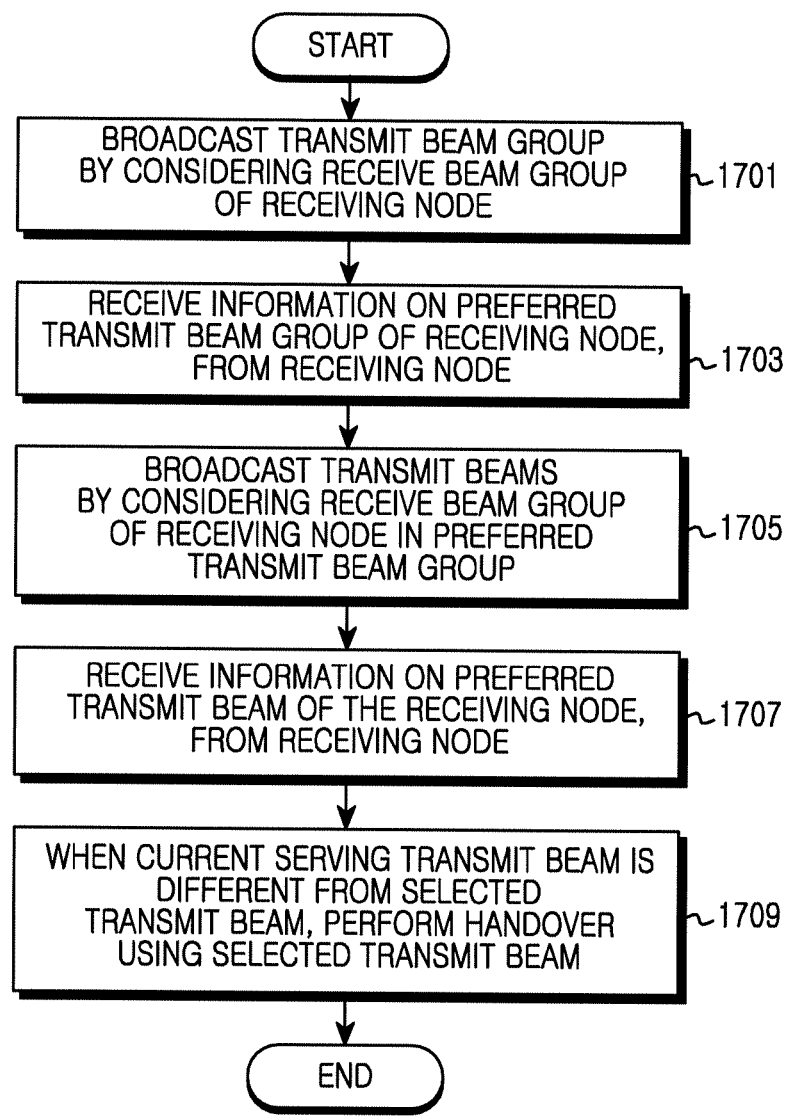
FIG. 17 illustrates example operations of a transmitting node for the dedicated search in the wireless communication system according to this disclosure.

FIG. 17 illustrates example operations of a transmitting node for the dedicated search in the wireless communication system according to this disclosure. The operations of FIG. 17 are performed by the transmitting node, and the transmitting node includes one of the BS for the downlink communication and the MS for the uplink communication. Referring to FIG. 17, the transmitting node broadcasts the transmit beam group by taking into account the receive beam group of a receiving node in operation 1701. That is, the transmitting node determines the number of the repetitive reference signal transmissions per transmit beam group according to the maximum number of the receive beam groups of the receiving node, and transmits the reference signals beamformed with the transmit beam groups according to the determined number.

In operation 1703, the transmitting node receives information on preferred transmit beam group of the receiving node, from the receiving node. Alternatively, the transmitting node receives from the receiving node the measurement result of the beam group pairs measured by the receiving node, and determine the preferred transmit beam group of the receiving node based on the measurement result. In operation 1705, the transmitting node broadcasts the transmit beams by considering the receive beams of the receiving node in the preferred transmit beam group. That is, the transmitting node determines the number of the repetitive reference signal transmissions per transmit beam according to the maximum number of the receive beams per beam group of at least one receiving node, and transmits the reference signals beamformed with the transmit beams according to the determined number.

In operation 1707, the transmitting node receives information on the preferred transmit beam of the receiving node, from the receiving node. Alternatively, the transmitting node receives from the receiving node the measurement result of the beam pairs measured by the receiving node, and determine the preferred transmit beam of the receiving node based on the measurement result. When the current serving transmit beam and the selected transmit beam are different, the transmitting node performs the handover with the selected transmit beam in operation 1709. Herein, the handover includes at least one of the serving BS change and the serving beam change. For example, when the serving beam is changed alone, the handover includes only the BS beam change.

Figure 18:
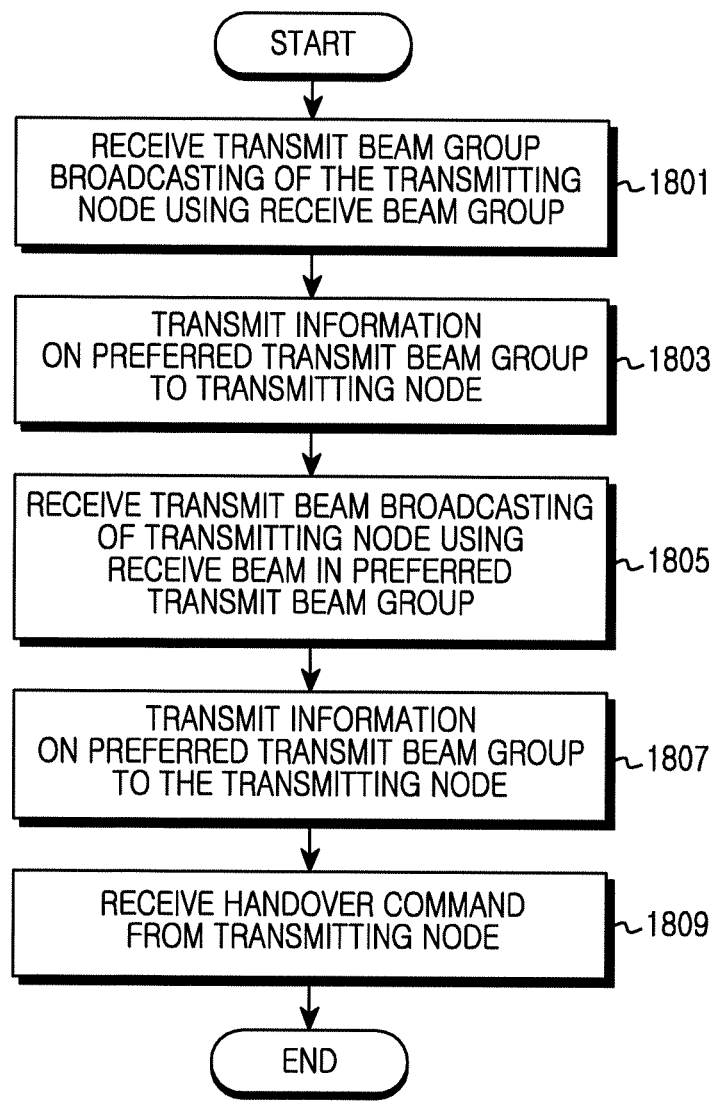
FIG. 18 illustrates example operations of a receiving node for the dedicated search in the wireless communication system according to this disclosure.

FIG. 18 illustrates example operations of the receiving node for the dedicated search in the wireless communication system according to this disclosure. The operations of FIG. 18 are performed by the receiving node, and the receiving node includes one of the BS for the downlink communication and the MS for the uplink communication. Referring to FIG. 18, the receiving node receives the transmit beam group broadcasting of the transmitting node using the receive beam group in operation 1801. The receiving node performs receive-beamforming the reference signals beamformed by at least one transmitting node with the transmit beam groups, with the receive beam groups.

In operation 1803, the receiving node transmits the information on the preferred transmit beam group to the transmitting node. That is, the receiving node measures every beam group pair and feeds information on a transmit beam group of the preferred or optimal beam group pair of the best channel quality, back to the transmitting node. Alternatively, the receiving node transmits the measurement result of the beam group pairs. In operation 1805, the receiving node receives the transmit beam broadcasting of the transmitting node using the receive beams in the preferred transmit beam group. That is, the receiving node performs receive-beamforming the reference signals beamformed by at least one transmitting node with the transmit beams, with the receive beams of the receive beam group of the preferred or optimal beam group pair.

In operation 1807, the receiving node transmits the information on the preferred transmit beam to the transmitting node. That is, the receiving node measures every beam pair of the preferred beam group pair, and feeds information on a transmit beam of the preferred or optimal beam pair of the best channel quality, back to the transmitting node. Alternatively, the receiving node transmits the measurement result of the beam pairs. In operation 1809, the receiving node receives the command instructing the handover, from the transmitting node. When the receiving node is the BS, it transmits the command instructing the handover.

Figure 19:
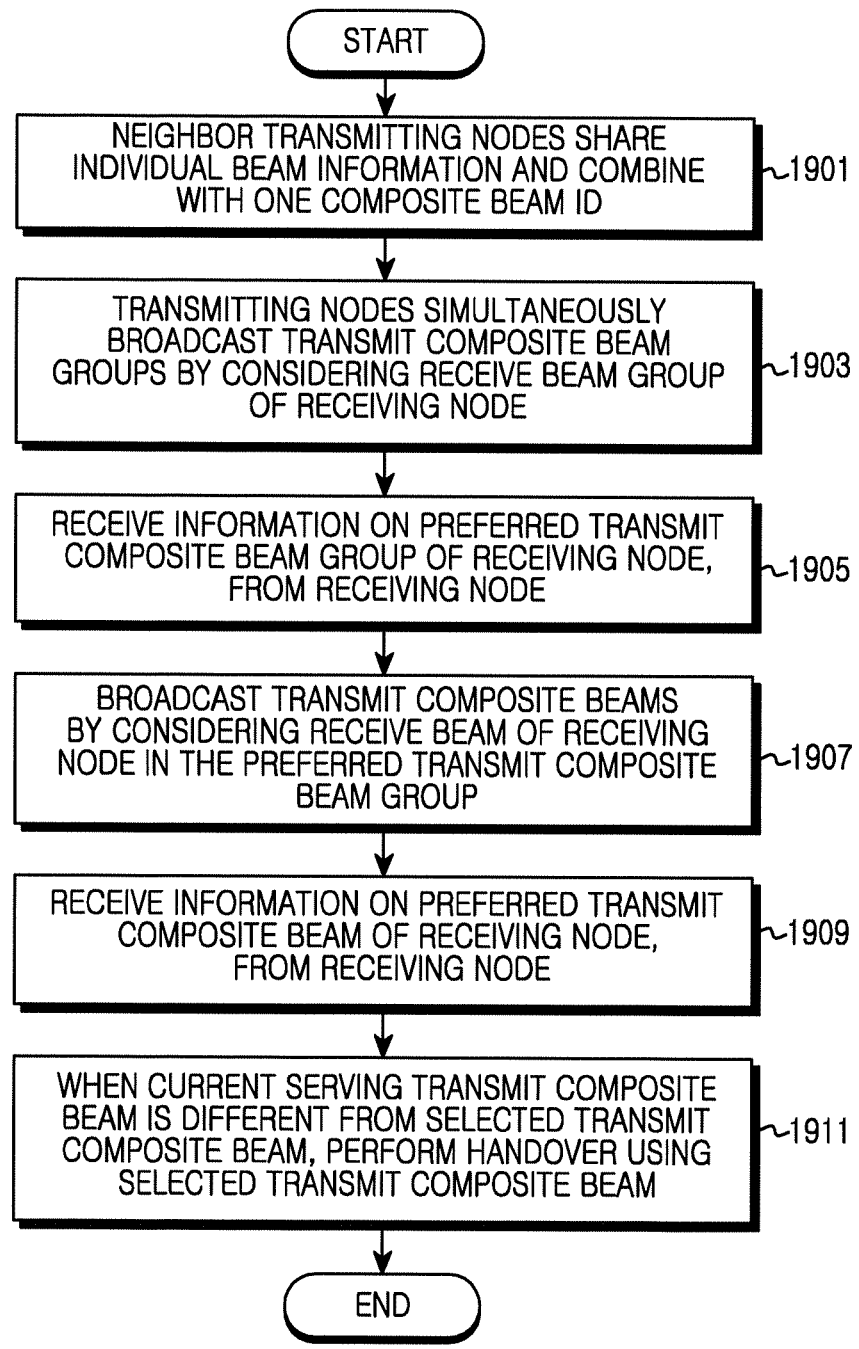
FIG. 19 illustrates example operations of the transmitting node for the collective search in the wireless communication system according to this disclosure.

FIG. 19 illustrates example operations of the transmitting node for the collective search in the wireless communication system according to this disclosure. The operations of FIG. 19 are performed by the transmitting node, and the transmitting node includes one of the BS for the downlink communication and the MS for the uplink communication. Referring to FIG. 19, the plurality of the neighbor transmitting nodes shares the individual beam information and combines the transmitting node beams with one composite beam ID in operation 1901. The individual beam information is shared via the separate control node besides the transmitting nodes. Alternatively, the individual beam information is shared under the control of one of the transmitting nodes.

In operation 1903, the transmitting nodes simultaneously broadcast the transmit composite beam groups by considering the receive beam group of the receiving node. That is, the transmitting nodes determine the number of the repetitive reference signal transmissions per transmit composite beam group according to the maximum number of the receive beam groups of at least one receiving node, and transmit the reference signals beamformed with the transmitting composite beam groups according to the determined number. In operation 1905, the transmitting nodes receive information on preferred transmit composite beam group of the receiving node, from the receiving node. Alternatively, the transmitting nodes receives the measurement result of the composite beam group pairs measured by the receiving node, from the receiving node, and determine the preferred transmit composite beam group of the receiving node based on the measurement result.

In operation 1907, the transmitting nodes broadcast the transmit composite beams by considering the receive beam of the receiving node in the preferred transmit composite beam group. Namely, the transmitting node determines the number of the repetitive reference signal transmissions per transmit beam according to the maximum number of the receive beams per beam group of at least one receiving node, and transmits the reference signals beamformed with the transmitting composite beams according to the determined number. In operation 1909, the transmitting node receives information on a preferred transmit composite beam of the receiving node, from the receiving node. Alternatively, the transmitting node receives the measurement result of the composite beam pairs measured by the receiving node, from the receiving node, and determine the preferred transmit beam of the receiving node based on the measurement result. When the current serving transmit composite beam and the selected transmit composite beam are different, the transmitting node performs the handover with the selected transmit composite beam in operation 1911. Herein, the handover includes at least one of the serving BS change and the serving composite beam change. For example, when only the serving composite beam is changed, the handover includes only the BS beam change.

Figure 20:
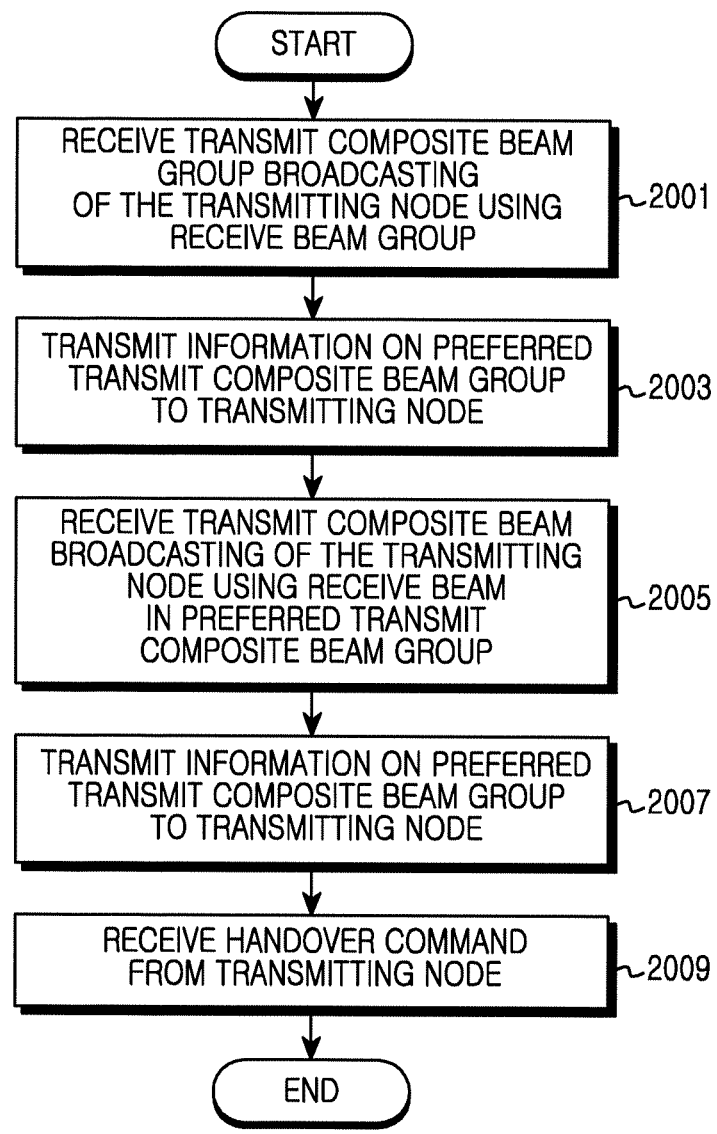
FIG. 20 illustrates example operations of the receiving node for the collective search in the wireless communication system according to this disclosure.

FIG. 20 illustrates example operations of the receiving node for the collective search in the wireless communication system according to this disclosure. The operations of FIG. 20 are performed by the receiving node, and the receiving node includes one of the BS for the downlink communication and the MS for the uplink communication. Referring to FIG. 20, the receiving node receives the transmitting composite beam group broadcasting of the transmitting node using the receive beam group in operation 2001. The receiving node performs receive-beamforming the reference signals beamformed by at least one transmitting node with the transmitting composite beam groups, with the receive beam groups.

In operation 2003, the receiving node transmits the information on the preferred transmit composite beam group to the transmitting node. That is, the receiving node measures every beam group pair and feeds the transmit composite beam group information of the preferred or optimal beam group pair of the best channel quality, back to the transmitting node. Alternatively, the receiving node transmits the measurement result of the beam group pairs. In operation 2005, the receiving node receives the transmitting composite beam broadcasting of the transmitting node using the receive beams in the preferred transmit composite beam group. That is, the receiving node performs receive-beamforming the reference signals beamformed by at least one transmitting node with the transmitting composite beams, with the receive beams of the receive beam group of the preferred or optimal beam group pair.

In operation 2007, the receiving node transmits information on a preferred transmit composite beam to the transmitting node. That is, the receiving node measures every beam pair of the preferred beam group pair, and feeds the transmit information on a composite beam of the preferred or optimal beam pair of the best channel quality, back to the transmitting node. Alternatively, the transmitting node transmits the measurement result of the beam pairs. In operation 2009, the receiving node receives the command instructing the handover, from the transmitting node. When the receiving node is the BS, it transmits the command instructing the handover.

Figure 21:
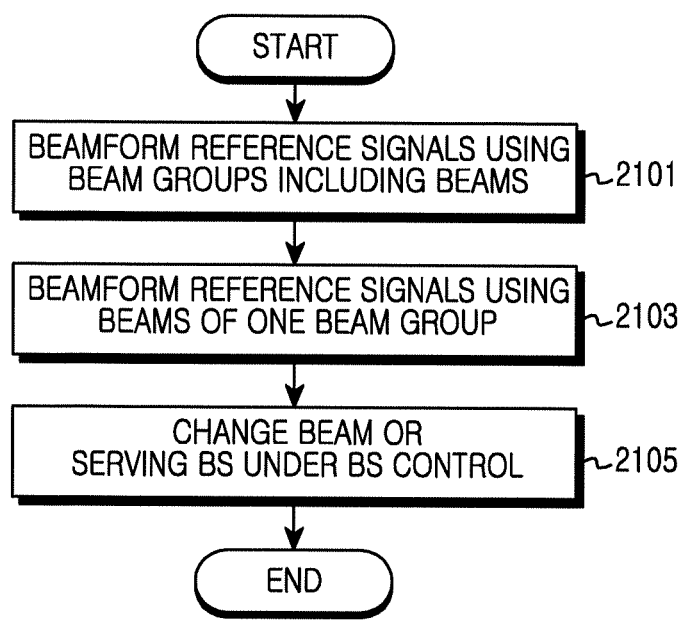
FIG. 21 illustrates an example operation of the MS in the wireless communication system according to this disclosure.

FIG. 21 illustrates an example operation of the MS in the wireless communication system according to this disclosure. Referring to FIG. 21, the MS beamforms the reference signals using the beam groups including the plurality of the beams in operation 2101. Herein, the beamforming includes one of the transmit-beamforming and the receive-beamforming. The beam group is the group of the beams, and the number of the beams in one beam group differs according to the MS capability. When the MS serves as the transmitting node, the MS performs transmit-beamforming the reference signals using the transmit beam groups and then transmits the reference signals beamformed with the different transmit beam groups. In so doing, the reference signal is repetitively transmitted with respect to one of the transmit beam groups, and the number of the repetitions differs according to the number of the receive beam groups of the at least one BS for receiving the reference signal. When the MS serves as the receiving node, the MS performs receive-beamforming the reference signals beamformed by the at least one BS with the beam groups, using the receive beam groups. In so doing, the beam group used by the at least one BS includes one of the individual beam group for each BS and the composite beam group combining the beams of the BSs. Compared to the individual beam group, the composite beam group lessens the number of the measurements in operation 2101.

In operation 2103, the MS beamforms the reference signals using the beams of one beam group. Herein, the one beam group is the MS beam group in the optimal beam group pair of the beam groups used in operation 2101. When the MS serves as the transmitting node, the MS performs transmit-beamforming the reference signals using the transmit beams and then transmits the reference signals beamformed with the different transmit beams. When the MS serves as the receiving node, the MS performs receive-beamforming the reference signals beamformed by the at least one BS with the different transmit beams, using the receive beams. In so doing, the transmit beams used by the at least one BS are the transmit beams of the BS beam group in the optimal beam group pair. The beams used by the at least one BS includes one of the individual BS beam and the composite beam combining the beams of the BSs.

In operation 2105, the MS changes the beam or the serving BS under the control of the at least one BS. That is, the MS changes only the serving beam with the serving BS maintained, or change the serving BS and the serving beam. Although it is not illustrated in FIG. 21, when the MS serves as the receiving node, the MS measures the channel quality and transmit the measurement result to the at least one BS. In more detail, after operation 2101, the MS measures the channel quality of every beam group pair between the transit beam groups of the BS and the receive beam groups of the MS, and transmit the measurement result to the at least one BS. After operation 2103, the MS measures the channel quality of every beam pair between the transit beams of the BS and the receive beams of the MS, and transmit the measurement result to the at least one BS.

Although it is not illustrated in FIG. 21, when the MS serves as the transmitting node, the MS receives the beam group or beam measurement result notification from the at least one BS. In more detail, after operation 2101, the MS receives the notification of the optimal beam group pair or the MS transmit beam group of the optimal beam group pair, from the at least one BS. After operation 2103, the MS receives the notification of the optimal beam pair or the MS transmit beam of the optimal beam pair, from the at least one BS.

Figure 22:
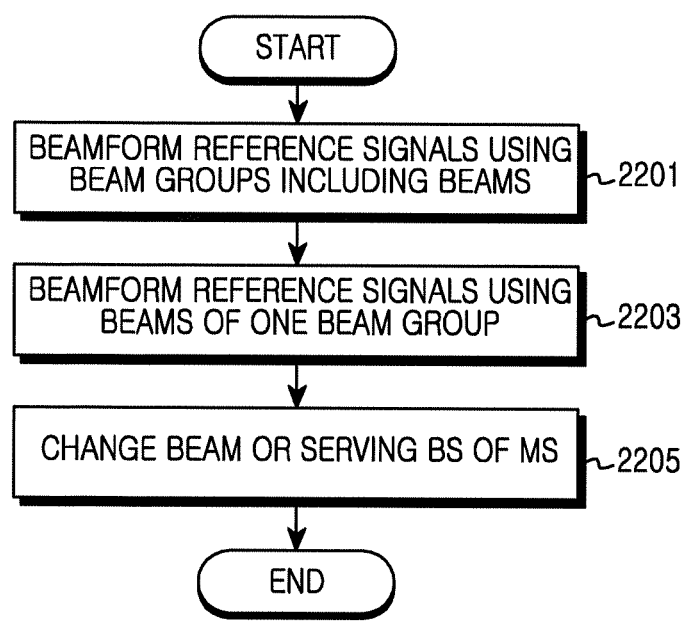
FIG. 22 illustrates an example operation of the BS in the wireless communication system according to this disclosure.

FIG. 22 illustrates an example operation of the BS in the wireless communication system according to this disclosure. Referring to FIG. 22, the BS beamforms the reference signals using the beam groups including the plurality of the beams in operation 2201. Herein, the beamforming includes one of the transmit-beamforming and the receive-beamforming. The beam group is the group of the beams, and the number of the beams in one beam group differs according to the BS capability. When the BS serves as the transmitting node, the BS performs transmit-beamforming the reference signals using the transmit beam groups and then transmits the reference signals beamformed with the different transmit beam groups. In so doing, the reference signal is repetitively transmitted with respect to one of the transmit beam groups, and the number of the repetitions differs according to the number of the receive beam groups of the MSs for receiving the reference signals. The beam group used by the BS includes one of the individual beam group and the composite beam group combining the beams with the neighbor BSs. The composite beam group lessens the number of the reference signal measurements, compared to the individual beam group. When the BS serves as the receiving node, the BS performs receive-beamforming the reference signals beamformed by the MS with the beam groups, using the receive beam groups.

In operation 2203, the MS beamforms the reference signals using the beams of one beam group. Herein, the one beam group is the beam group of the BS in the optimal beam group pair of the beam groups used in operation 2201. When the BS serves as the transmitting node, the BS performs transmit-beamforming the reference signals using the transmit beams and then transmits the reference signals beamformed with the different transmit beams. The beams used by the BS include one of the individual beam and the composite beam combining the beams with the neighbor BSs. When the BS serves as the receiving node, the BS performs receive-beamforming the reference signals beamformed by the MS with the different transmit beams, using the receive beams. In so doing, the beams used by the MS are the transmit beams of the MS beam group of the optimal beam group pair.

In operation 2205, the BS changes the beam or the serving BS of the MS. That is, the BS changes only the serving beam with the serving BS of the MS maintained, or change the serving BS and the serving beam. For example, to change the serving BS, the BS performs the handover procedure as the serving BS or the target BS. For example, to change the serving beam, the BS performs the beam scheduling. Although it is not illustrated in FIG. 22, when the BS serves as the transmitting node, the BS receives the measurement result of the beam group or the beam from the MS. In more detail, after operation 2201, the BS receives the report about the optimal beam group pair or the BS transmit beam group of the optimal beam group pair, from the MS. After operation 2203, the BS receives the report about the optimal beam pair or the BS transmit beam of the optimal beam pair, from the MS.

Although it is not illustrated in FIG. 22, when the BS serves as the receiving node, the BS measures the channel quality. In more detail, after operation 2201, the BS measures the channel quality of every beam group pair between the transit beam groups of the MS and the receive beam groups of the BS. The BS transmits the notification of the optimal beam group pair or the MS transmit beam group of the optimal beam group pair. After operation 2203, the BS measures the channel quality of every beam pair between the transit beams of the MS and the receive beams of the BS. The BS transmits the notification of the optimal beam pair or the MS transmit beam of the optimal beam pair. When the separate control node determines the optimal beam group pair or the optimal beam pair, the BS provides the measurement result to the control node.

Figure 23:
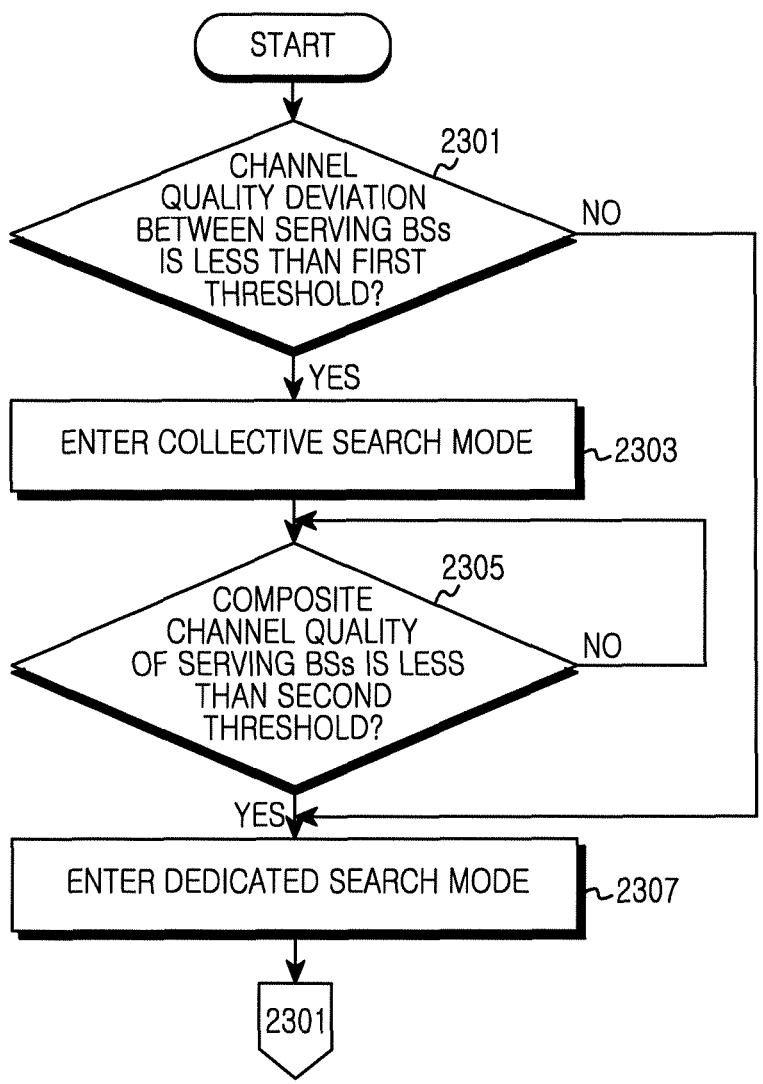
FIG. 23 illustrates example operations for the search mode transition in the wireless communication system according to this disclosure.

FIG. 23 illustrates example operations for the search mode transition in the wireless communication system according to this disclosure, where the dedicated search mode is assumed initially. The search mode transition is determined by the BS or the MS. To facilitate the understanding, the entity for determining the mode transition is referred to as a determiner. Referring now to FIG. 23, the determiner deter nines whether the channel quality deviation between the serving BSs is less than a first threshold in operation 2301. That is, the determiner determines whether the channel quality difference between the serving BSs is less than a certain level. For example, the deviation is determined based on at least one of the variation of the channel qualities and the difference between the maximum and the minimum.

When the channel quality deviation is less than the first threshold, the determiner operates in the collective search mode in operation 2303. That is, the determiner determines to transit from the dedicated search mode to the collective search mode. For example, when the determiner is the MS, the determiner switches to the collective search mode according to the request and the approval from the BS. Hence, the BSs perform the beamforming using the composite beam, and the MS measures the BSs using the single procedure.

In operation 2305, the determiner determines whether the composite channel quality of the serving BSs is less than a second threshold. The composite channel quality is based on the use of the composite beam and indicates the statistical channel quality of the channels of the BSs. When the composite channel quality is less than the second threshold, the determiner operates in the dedicated search mode in operation 2307. That is, the determiner determines to transit from the collective search mode to the dedicated search mode. For example, when the determiner is the MS, the determiner switches to the dedicated search mode according to the request and the approval from the BS. Hence, the BSs perform the beamforming using the individual beam, and the MS measures the BSs individually.

Figure 24:
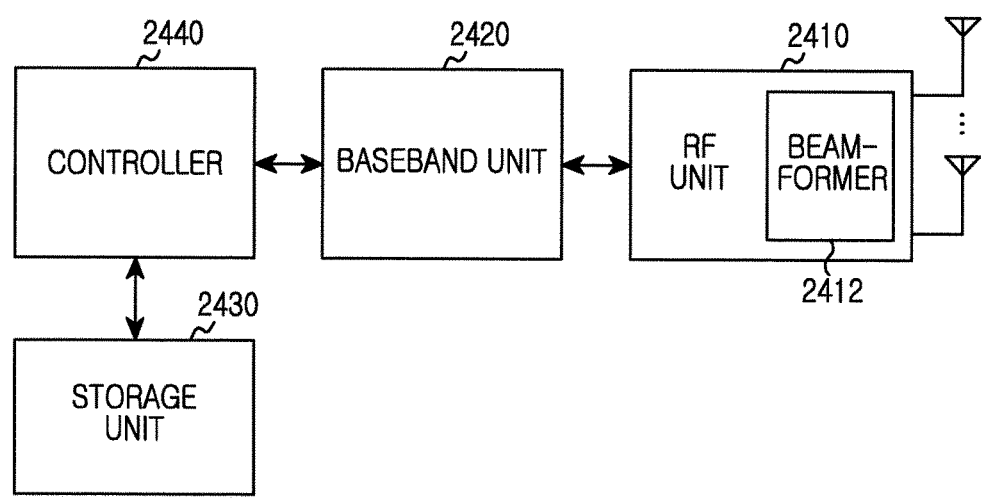
FIG. 24 illustrates an example MS in the wireless communication system according to this disclosure.

FIG. 24 is a block diagram of an example MS in the wireless communication system according to this disclosure. Referring to FIG. 24, the MS includes a Radio Frequency (RF) unit 2410, a baseband unit 2420, a storage unit 2430, and a controller 2440. The RF unit 2410 transmits and receives signals over a radio channel through signal band conversion and amplification. That is, the RF unit 2410 up-converts a baseband signal fed from the baseband unit 2420 to an RF signal, transmits the RF signal over an antenna, and down-converts an RF signal received over the antenna to a baseband signal. For example, the RF unit 2410 includes a transmit filter, a receive filter, an amplifier, a mixer, an oscillator, a Digital to Analog Converter (DAC) and an Analog to Digital Converter (ADC). While only one antenna is depicted in FIG. 24, the MS includes a plurality of antennas. The RF unit 2410 includes a plurality of RF chains, and performs the beamforming. For the beamforming, the RF unit 2410 includes a beamformer 2412 for adjusting a phase and a level of the signals transmitted and received via the antennas or antenna elements.

The baseband unit 2420 converts the baseband signal and a bit stream according to a physical layer standard of the system. For example, for the data transmission, the baseband unit 2420 generates complex symbols by encoding and modulating the transmit bit stream. For the data reception, the baseband unit 2420 restores the received bit stream by demodulating and decoding the baseband signal fed from the RF unit 2410. For example, in a data transmission based on Orthogonal Frequency Division Multiplexing (OFDM), the baseband unit 2420 generates the complex symbols by encoding and modulating the transmit bit stream, maps the complex symbols to subcarriers, and generates OFDM symbols using Inverse Fast Fourier Transform (IFFT) and Cyclic Prefix (CP) addition. For the data reception, the baseband unit 2420 splits the baseband signal fed from the RF unit 2410 into OFDM symbols, restores the signals mapped to the subcarriers using Fast Fourier Transform (FFT), and restores the received bit stream by demodulating and decoding the signals. As such, the baseband unit 2420 and the RF unit 2410 transmit and receive the signals. Thus, the baseband unit 2420 and the RF unit 2410 are referred to as a transmitter, a receiver, a transceiver, a communication unit, or any other similar and/or suitable name for an element that transmits and/or receives signals.

The storage unit 2430 stores a basic program for operating the MS, an application program, and data such as setting information. The storage unit 2430 provides the stored data according to a request of the controller 2440. The controller 2440 controls the operations of the MS. For example, the controller 2440 transmits and receives the signals through the baseband unit 2420 and the RF unit 2410. In addition, the controller 2440 records and reads data in the storage unit 2440. For doing so, the controller 2440 includes at least one processor. The controller 2440 controls to scan the beam using the beam group and to scan the beam using the beams of the optimal beam group. For example, the controller 2440 controls to perform the MS operations as explained in FIGS. 4, 5, 8, 11, 13, 14, 15, 16, 17, 18, 19, 20, 21, 22, and 23. For example, the controller 2440 operates as follows.

When the MS operates as the receiving node, the controller 2440 controls the RF unit 2410 to perform receive-beamforming the reference signals beamformed with the beam groups in the at least one BS, using the receive beam groups. The beam group used by the at least one BS includes one of the individual beam group of each BS and the composite beam group combining the beams of the BSs. The controller 2440 measures the channel quality of the beam group pairs of the transmit beam groups of the at least one BS and the receive beam groups of the MS, and transmits the measurement result to the at least one BS through the baseband unit 2420 and the RF unit 2410. The controller 2440 controls the RF unit 2410 to perform receive-beamforming the reference signals beamformed with the different transmit beams in the at least one BS, using the receive beams. In so doing, the transmit beams used by the at least one BS includes the transmit beams of the BS beam group of the optimal beam group pair. The beams used by the at least one BS includes one of the individual beam of each BS and the composite beam combining the beams of the BSs. The controller 2440 measures the channel quality of the beam pairs of the BS transmit beams and the MS receive beams, and transmits the measurement result to the at least one BS through the baseband unit 2420 and the RF unit 2410.

When the MS operates as the transmitting node, the controller 2440 controls the RF unit 2410 to perform transmit-beamforming the reference signals using the transmit beam groups and to transmit the reference signals beamformed with the different transmit beam groups. The reference signal for one of the transmit beam groups is repetitively transmitted, and the number of the repetitions differs according to the number of the receive beam groups of at least one BS for receiving the reference signal. Next, when the at least one BS notifies the optimal beam group pair or the MS transmit beam group of the optimal beam group pair, the controller 2440 controls the RF unit 2410 to perform transmit-beamforming the reference signals using the transmit beams and to transmit the reference signals beamformed with the different transmit beams.

After the transmitting node or the receiving node scans the beams, the controller 2440 changes the beam or the serving BS under the control of the at least one BS. That is, the controller 2440 changes the serving beam alone with the serving BS maintained, or change the serving BS and the serving beam.

Figure 25:
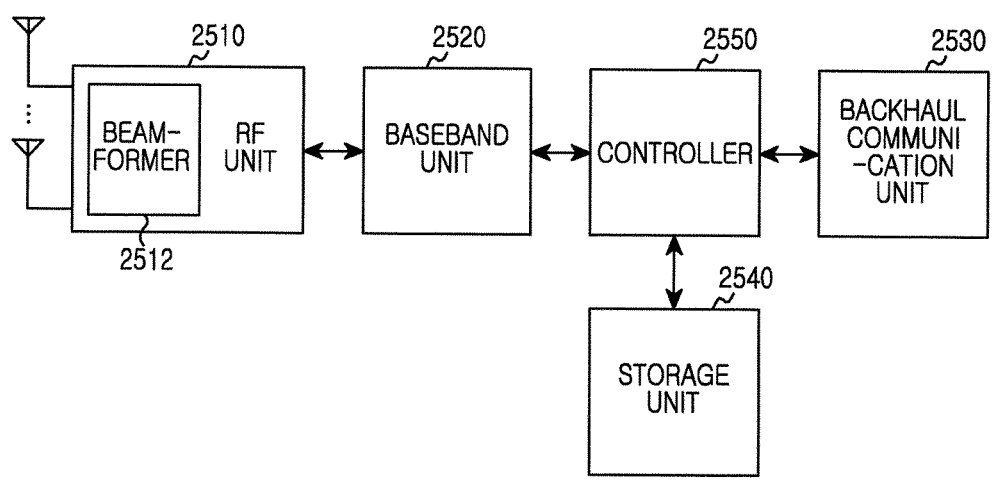
FIG. 25 illustrates an example BS in the wireless communication system according to this disclosure.

FIG. 25 is a block diagram of the BS in the wireless communication system according to an exemplary embodiment of the present disclosure. Referring to FIG. 25, the BS includes an RF unit 2510, a baseband unit 2520, a backhaul communication unit 2530, a storage unit 2540, and a controller 2550. The RF unit 2510 transmits and receives signals over the radio channel through the signal band conversion and amplification. That is, the RF unit 2510 up-converts a baseband signal fed from the baseband unit 2520 to an RF signal, transmits the RF signal over an antenna, and down-converts an RF signal received over the antenna to a baseband signal. For example, the RF unit 2510 includes a transmit filter, a receive filter, an amplifier, a mixer, an oscillator, a DAC and an ADC. While only one antenna is depicted in FIG. 25, the BS includes a plurality of antennas. The RF unit 2510 includes a plurality of RF chains. The RF unit 2510 performs the beamforming. For the beamforming, the RF unit 2510 includes a beamformer 2512 for adjusting the phase and the level of the signals transmitted and received via the antennas or antenna elements.

The baseband unit 2520 converts the baseband signal and the bit stream according to the physical layer standard of the system. For example, for the data transmission, the baseband unit 2520 generates complex symbols by encoding and modulating the transmit bit stream. For the data reception, the baseband unit 2520 restores the received bit stream by demodulating and decoding the baseband signal fed from the RF unit 2510. For example, in the data transmission based on the OFDM, the baseband unit 2520 generates the complex symbols by encoding and modulating the transmit bit stream, maps the complex symbols to subcarriers, and generates OFDM symbols using the IFFT and the CP addition. For the data reception, the baseband unit 2520 splits the baseband signal fed from the RF unit 2510 into OFDM symbols, restores the signals mapped to the subcarriers using the FFT, and restores the received bit stream by demodulating and decoding the signals. As such, the baseband unit 2520 and the RF unit 2510 transmit and receive the signals. Hence, the baseband unit 2520 and the RF unit 2510 are referred to as a transmitter, a receiver, a transceiver, a communication unit, a wireless communication unit, or any other similar and/or suitable name for an element that transmits and/or receives signals.

The backhaul communication unit 2530 provides an interface for communicating with other nodes in the network. That is, the backhaul communication unit 2530 converts the bit stream, to be transmitted from the BS to other node, for example, to other BS and/or a core network, into the physical signal and converts the physical signal received from the other node into the bit stream. The storage unit 2540 stores a basic program for operating the BS, an application program, and data such as setting information. The storage unit 2540 provides the stored data according to a request of the controller 2550.

The controller 2550 controls the operations of the BS. For example, the controller 2540 transmits and receives the signals through the baseband unit 2520 and the RF unit 2510, or the backhaul communication unit 2530. The controller 2550 records and reads data to and from the storage unit 2540. For doing so, the controller 2540 includes at least one processor. The controller 2550 controls to scan the beam using the beam group and to scan the beam using the beams of the optimal beam group. For example, the controller 2550 controls to perform the BS operations as explained in FIGS. 4, 5, 8, 11, 13, 14, 15, 16, 17, 18, 19, 20, 21, 22, and 23. For example, the controller 2440 operates as follows.

When the BS operates as the transmitting node, the controller 2550 controls the RF unit 2510 to perform transmit-beamforming the reference signals using the transmit beam groups and to transmit the reference signals beamformed with the different transmit beam groups. In so doing, the reference signal is repetitively transmitted with respect to one of the transmit beam groups, and the number of the repetitions differs according to the number of the receive beam groups of the MSs for receiving the reference signal. The beam group used by the BS includes one of the individual beam group and the composite beam group combining the beams with the neighbor BSs. Next, the controller 2550 receives from the MS the report about the optimal beam group pair or the BS transmit beam group of the optimal beam group pair. The controller 2550 controls the RF unit 2410 to perform transmit-beamforming the reference signals using the transmit beams of the optimal beam group pair and to transmit the reference signals beamformed with the different transmit beams. The controller 2550 receives from the MS the report about the optimal beam pair or the BS transmit beam of the optimal beam pair.

When the BS operates as the receiving node, the controller 2550 controls the RF unit 2510 to perform receive-beamforming the reference signals beamformed with the beam groups in the MS, using the receive beam groups. The controller 2550 measures the channel quality of the beam group pairs between the transmit beam groups of the MS and the receive beam groups of the BS. The controller 2550 notifies the optimal beam group pair or the MS transmit beam group of the optimal beam group pair. Next, the controller 2550 controls the RF unit 2510 to perform receive-beamforming the reference signals beamformed with the different transmit beams in the MS, using the receive beams. Further, the controller 2550 measures the channel quality of the beam pairs between the MS transmit beams and the BS receives beams. The controller 2550 transmits a notification for the optimal beam pair or a transmit beam of the MS of the optimal beam pair, to the at least one BS.

The controller 2550 changes the beam or the serving BS of the MS. That is, the controller 2550 changes the serving beam alone with the serving BS of the MS maintained, or change the serving BS and the serving beam. For example, to change the serving BS, the controller 2550 performs the handover procedure as the serving BS or the target BS. For example, to change the serving beam, the controller 2550 schedules the beam. When the separate control node determines the optimal beam group pair or the optimal beam pair, the controller 2550 provides the measurement result to the control node.

As set forth above, the beams are sequentially scanned using the beam group and the individual beam in the wireless communication system. Therefore, the time delay for determining the preferred or optimal beam is reduced in the environment including the plurality of the transmit and receive beams.

Embodiments of the present invention according to the claims and description in the specification can be realized in the form of hardware, software or a combination of hardware and software.

Such software may be stored in a computer readable storage medium. The computer readable storage medium stores one or more programs (software modules), the one or more programs comprising instructions, which when executed by one or more processors in an electronic device, cause the electronic device to perform methods of the present invention.

Such software may be stored in the form of volatile or non-volatile storage such as, for example, a storage device like a Read Only Memory (ROM), whether erasable or rewritable or not, or in the form of memory such as, for example, Random Access Memory (RAM), memory chips, device or integrated circuits or on an optically or magnetically readable medium such as, for example, a Compact Disc (CD), Digital Video Disc (DVD), magnetic disk or magnetic tape or the like. It will be appreciated that the storage devices and storage media are embodiments of machine-readable storage that are suitable for storing a program or programs comprising instructions that, when executed, implement embodiments of the present invention. Embodiments provide a program comprising code for implementing apparatus or a method as claimed in any one of the claims of this specification and a machine-readable storage storing such a program. Still further, such programs may be conveyed electronically via any medium such as a communication signal carried over a wired or wireless connection and embodiments suitably encompass the same.

While the disclosure has been shown and described with reference to certain exemplary embodiments thereof, it will be understood by those skilled in the art that various changes in form and details are made therein without departing from the spirit and scope of the disclosure as defined by the appended claims and their equivalents.

What is claimed is:

1. A method for operating a terminal in a wireless communication system, comprising:
   receiving, from a first base station (BS), each of reference signal sets via each of receive (Rx) beam groups of the terminal, wherein each of the reference signal sets is transmitted via each of transmit (Tx) beam groups of the first BS;
   transmitting, to the first BS, information regarding measurement on the reference signal sets; and
   receiving, from the first BS, each of reference signals of a first set identified among the reference signal sets based on the information,
   wherein each of the beam groups is a bundle of beams for beamforming a reference signal set transmitted or received at the same time,
   wherein each of the reference signals of the first set is transmitted via each of Tx beams of a Tx beam group identified among the Tx beam groups of the first BS, based on the information, and
   wherein each of the reference signals of the first set is received via each of Rx beams of a Rx beam group identified among the Rx beam groups of the terminal, based on the information.

2. The method of claim 1, further comprising:
   transmitting, to the first BS, feedback information for indicating at least one Tx beam,
   wherein the at least one Tx beam is identified among the Tx beams of the Tx beam group based on a channel quality for each of the reference signals of the first set.

3. The method of claim 1, further comprising:
   determining a channel quality for beam group pairs for each of the Tx beam groups and each of Rx beam groups; and
   determining a beam group pair among the beam group pairs based on the determined channel quality,
   wherein the Tx beam group and the Rx beam group belong to the determined beam group pair having best channel quality among the beam group pairs, and
   wherein the determined beam group pair corresponds to the first set among the reference signal sets.

4. The method of claim 3, wherein the Tx beam group comprises composite beams, and
   wherein each of the composite beams comprises a first Tx beam used by the first BS and a second Tx beam used by a second BS.

5. The method of claim 3, further comprising
   determining channel quality for beam pairs of each of the Tx beams for the Tx beam group and each of the Rx beams for the Rx beam group; and
   determining a beam pair among the beam pairs based on the determined channel quality,
   wherein the Tx beam group and the Rx beam group correspond to the first set.

6. The method of claim 4, wherein a first coverage of the first Tx beam and a second coverage of the second Tx beam are at least partly overlapped.

7. The method of claim 4, further comprising:
   if a channel quality deviation for the first Tx beam and the second Tx beam is equal to or smaller than a threshold, operating in a mode where the first BS and the second BS perform a cooperative transmission based on a composite beam comprising the first Tx beam and the second Tx beam.

8. The method of claim 4, further comprising:
   if a statistical channel quality for a composite beam is equal to or smaller than a threshold, operating in a mode where the first BS and the second BS perform an individual transmission based on an individual Tx beam.

9. The method of claim 3, further comprising:
   receiving, from a second BS, second reference signal sets being transmitted via second Tx beam groups comprising second Tx beams of the second BS;
   comparing channel quality for each of the reference signal sets and each of the second reference signal sets;
   transmitting, to the first BS, information regarding the compared channel quality;
   receiving a message for indicating handover to the second BS based on the information; and
   performing handover to the second BS based on a second beam group pair,
   wherein the second beam group pair corresponds to a second Tx beam group of the second Tx beam groups.

10. The method of claim 3, wherein the Tx beams included in the Tx beam group comprises at least one Tx beam being not adjacent each other, and
    wherein the Rx beams included in the Rx beam group comprises at least one Rx beam being not adjacent each other.

11. A method for operating a first base station (BS) in a wireless communication system, comprising:
    transmitting, to a terminal, each of reference signal sets via each of transmit (Tx) beam groups of the first BS, wherein each of the reference signal sets is received via each of receive (Rx) beam groups of the terminal;
    receiving, from the terminal, information regarding measurement on the reference signal sets; and
    transmitting, to the terminal, each of reference signals of a first set identified among the reference signal sets based on the information,
    wherein each of the beam groups is a bundle of beams for beamforming a reference signal set transmitted or received at the same time,
    wherein each of the reference signals of the first set is transmitted via each of Tx beams of a Tx beam group identified among the Tx beam groups of the first BS, based on the information, and
    wherein each of the reference signals of the first set is received via each of Rx beams of a Rx beam group identified among the Rx beam group of the terminal, based on the information.

12. The method of claim 11, further comprising:
    receiving, from the terminal, feedback information for indicating at least one Tx beam,
    wherein the at least one Tx beam is identified among the Tx beams of the Tx beam group based on a channel quality for each of the reference signals of the first set.

13. The method of claim 11, wherein the Tx beam group comprises composite beams, and
    wherein each of the composite beams comprises a first Tx beam used by the first BS and a second Tx beam used by a second BS.

14. The method of claim 13, wherein a first coverage of the first Tx beam and a second coverage of the second Tx beam are at least partly overlapped.

15. The method of claim 11, wherein the Tx beam group and the Rx beam group belong to a beam group pair having a best channel quality among beam group pairs of each of the Tx beam groups and each of the Rx beam groups, and
wherein the beam group pair corresponds to the first set among the reference signal sets.

16. The method of claim 13, further comprising:
if a channel quality deviation for the first Tx beam and the second Tx beam is equal to or smaller than a threshold, operating in a mode where the first BS and the second BS perform a cooperative transmission based on a composite beam comprising the first Tx beam and the second Tx beam.

17. The method of claim 13, further comprising:
if a statistical channel quality for a composite beam is equal to or smaller than a threshold, operating in a mode where the first BS and the second BS perform an individual transmission based on an individual Tx beam.

18. The method of claim 13, further comprising:
receiving, from the terminal, information regarding channel quality for each of the reference signal sets and each of second reference signal sets; and
transmitting, to the terminal, a message indicating to perform handover based on the information,
wherein a beam group pair comprising the first TX beam and the second TX beam corresponds to the first set among the reference signal sets, and
wherein each of the second reference signal sets is transmitted from the second BS to the terminal.

19. The method of claim 11, wherein the Tx beams included in the Tx beam group comprises at least one Tx beam being not adjacent each other, and
wherein the Rx beams included in the Rx beam group comprises at least one Rx beam being not adjacent each other.

20. An apparatus for a terminal in a wireless communication system, comprising:
a transceiver; and
at least one processor, operatively connected to the transceiver, configured to:
receive, from a first base station (BS), each of reference signal sets being transmitted via each of transmit (Tx) beam groups of the first BS, wherein each of the reference signal sets is received via each of receive (Rx) beam groups of the terminal,
transmit, to the first BS, information regarding measurement on the reference signal sets, and
receive from the first BS, each of reference signals of a first set identified among the reference signal sets based on the information,
wherein each of the beam groups is a bundle of beams for beamforming a reference signal set transmitted or received at the same time,
wherein each of reference signals of the first set is transmitted via each of Tx beams of a Tx beam group identified among the Tx beam groups of the first BS, based on the information, and
wherein each of reference signals of the first set is received via each of Rx beams of a Rx beam group identified among the Rx beam groups of the terminal, based on the information.

21. The apparatus of claim 19, wherein the at least one processor is further configured to transmit, to the first BS, feedback information for indicating at least one Tx beam, and
wherein the at least one Tx beam is identified among the Tx beams of the Tx beam group based on a channel quality for each of the reference signals of the first set.

22. The apparatus of claim 19, wherein the at least one processor is further configured to:
determine channel quality for beam group pairs of each of the Tx beam groups and each of Rx beam groups; and
determine a beam group pair among the beam group pairs based on the determined channel quality,
wherein the Tx beam group and the Rx beam group belong to the determined beam group pair having best channel quality among the beam group pairs, and
wherein the determined beam group pair corresponds to the first set among the reference signal sets.

23. The apparatus of claim 21, wherein the Tx beam group comprises composite beams, and
wherein each of the composite beams comprises a first Tx beam used by the first BS and a second Tx beam used by a second BS.

24. The apparatus of claim 21, wherein the at least one processor is further configured to:
determine channel quality for beam pairs of each of the Tx beams for the Tx beam group and each of the Rx beams for the Rx beam group; and
determine a beam pair among the beam pairs based on the determined channel quality, and
wherein the Tx beam group and the Rx beam group correspond to the first set.

25. The apparatus of claim 23, wherein a first coverage of the first Tx beam and a second coverage of the second Tx beam are at least partly overlapped.

26. The apparatus of claim 23, wherein the at least one processor is further configured to:
if a channel quality deviation for the first Tx beam and the second Tx beam is equal to or smaller than a threshold, operate in a mode where the first BS and the second BS perform a cooperative transmission based on a composite beam comprising the first Tx beam and the second Tx beam.

27. The apparatus of claim 23, wherein the at least one processor is further configured to:
if a statistical channel quality for a composite beam is equal to or smaller than a threshold, operate in a mode where the first BS and the second BS perform an individual transmission based on an individual Tx beam.

28. The apparatus of claim 20, wherein the at least one processor is further configured to:
receive, from a second BS, second reference signal sets being transmitted via second Tx beam groups comprising second Tx beams of the second BS;
compare channel quality for each of the reference signal sets and each of the second reference signal sets;
transmit, to the first BS, information regarding the compared channel quality;
receive a message for indicating handover to the second BS based on the information; and
perform handover to the second BS based on a second beam group pair, and
wherein the second beam group pair corresponds to a second Tx beam group of the second Tx beam groups.

29. The apparatus of claim 21, wherein the Tx beams included in the Tx beam group comprises at least one Tx beam being not adjacent each other, and
   wherein the Rx beams included in the Rx beam group comprises at least one Rx beam being not adjacent each other.

30. An apparatus for a first base station (BS) in a wireless communication system, comprising:
   a transceiver; and
   at least one processor, operatively connected to the transceiver, configured to:
   transmit, to a terminal, each of reference signal sets via each of transmit (Tx) beam groups of the first BS, wherein each of the reference signal sets are received via each of receive (Rx) beam groups of the terminal,
   receive, from the terminal, information regarding measurement on the reference signal sets, and
   transmit, to the terminal, each of reference signals of a first set identified among the reference signal sets based on the information,
   wherein each of the beam groups is a bundle of beams for beamforming a reference signal set transmitted or received at the same time,
   wherein each of the reference signals of the first set is transmitted via each of Tx beams of a Tx beam group identified among the Tx beam groups of the first BS, based on the information, and
   wherein the each of the reference signals of the first set is received via each of Rx beams of a Rx beam group identified among the Rx beam group of the terminal, based on the information.

31. The apparatus of claim 30, wherein the at least one processor is further configured to:
   receive, from the terminal, feedback information for indicating at least one Tx beam,
   wherein the at least one Tx beam is identified among the Tx beams of the Tx beam group based on a channel quality for each of the reference signals of the first set.

32. The apparatus of claim 31, wherein the Tx beam group comprises composite beams, and
   wherein each of the composite beams comprises a first Tx beam used by the first BS and a second Tx beam used by a second BS.

33. The apparatus of claim 32, wherein a first coverage of the first Tx beam and a second coverage of the second Tx beam are at least partly overlapped.

34. The apparatus of claim 30, wherein the Tx beam group and the Rx beam group belong to a beam group pair having a best channel quality among beam group pairs of each of the Tx beam groups and each of the Rx beam groups, and
   wherein the beam group pair corresponds to the first set among the reference signal sets.

35. The apparatus of claim 32, wherein the at least one processor is further configured to:
   if a channel quality deviation for the first Tx beam and the second Tx beam is equal to or smaller than a threshold, operate in a mode where the first BS and the second BS perform a cooperative transmission based on a composite beam comprising the first Tx beam and the second Tx beam.

36. The apparatus of claim 32, wherein the at least one processor is further configured to:
   if a statistical channel quality for a composite beam is equal to or smaller than a threshold, operate in a mode where the first BS and the second BS perform an individual transmission based on an individual Tx beam.

37. The apparatus of claim 30, wherein the at least one processor is further configured to:
   receive, from the terminal, information regarding channel quality for each of the reference signal sets and each of second reference signal sets, and
   transmit, to the terminal, a message indicating to perform handover based on the information,
   wherein a beam group pair comprising a first TX beam and a second TX beam corresponds to the first set among the reference signal sets, and
   wherein each of the second reference signal sets is transmitted from a second BS to the terminal.

38. The apparatus of claim 31, wherein the Tx beams included in the Tx beam group comprises at least one Tx beam being not adjacent each other, and
   wherein the Rx beams included in the Rx beam group comprises at least one Rx beam being not adjacent each other.

* * * * *